US009753299B2

(12) United States Patent
Ishido et al.

(10) Patent No.: US 9,753,299 B2
(45) Date of Patent: Sep. 5, 2017

(54) OPTICAL ELEMENT

(71) Applicant: ASAHI GLASS COMPANY, LIMITED, Chiyoda-ku (JP)

(72) Inventors: So Ishido, Tokyo (JP); Hiroki Hotaka, Tokyo (JP); Kensuke Ono, Tokyo (JP); Takuji Nomura, Tokyo (JP)

(73) Assignee: Asahi Glass Company, Limited, Chiyoda-ku (JP)

(*) Notice: Subject to any disclaimer, the term of this patent is extended or adjusted under 35 U.S.C. 154(b) by 362 days.

(21) Appl. No.: 14/524,893

(22) Filed: Oct. 27, 2014

(65) Prior Publication Data
US 2015/0192783 A1 Jul. 9, 2015

Related U.S. Application Data

(63) Continuation of application No. PCT/JP2013/061802, filed on Apr. 22, 2013.

(30) Foreign Application Priority Data

Apr. 26, 2012 (JP) ................................ 2012-101834
Feb. 28, 2013 (JP) ................................ 2013-038498

(51) Int. Cl.
*G02B 27/58* (2006.01)
*G02B 1/11* (2015.01)
(Continued)

(52) U.S. Cl.
CPC ................ *G02B 27/58* (2013.01); *G02B 1/11* (2013.01); *G02B 5/005* (2013.01); *G02B 5/205* (2013.01);
(Continued)

(58) Field of Classification Search
CPC ........ G02B 27/58; G02B 5/005; G02B 5/205; G02B 5/206; G02B 5/208; G02B 5/223; G02B 27/0927
(Continued)

(56) References Cited

U.S. PATENT DOCUMENTS 3,958,062 A * 5/1976 Moynihan ......... B32B 17/10174
359/359
5,589,882 A * 12/1996 Shiraishi ............. G02B 5/1871
348/340
(Continued)

FOREIGN PATENT DOCUMENTS

JP 62-172319 7/1987
JP 10-268382 10/1998
(Continued)

OTHER PUBLICATIONS

U.S. Appl. No. 14/638,580, filed Mar. 4, 2015, Ono.
International Search Report issued Jul. 30, 2013 in PCT/JP2013/061802 filed Apr. 22, 2013.

*Primary Examiner* — Scott J Sugarman
*Assistant Examiner* — Kristina Deherrera
(74) *Attorney, Agent, or Firm* — Oblon, McClelland, Maier & Neustadt, L.L.P.

(57) ABSTRACT

An optical element in which transmittance of light monotonically decreases from a center portion toward a peripheral portion, the optical element includes an absorbing material portion made of a material that absorbs a part of light and formed such that its thickness monotonically increases from the center portion toward the peripheral portion; and a transparent material portion made of a material that transmits light and is stacked on the absorbing material portion, a total thickness of the absorbing material portion and the transparent material portion being substantially constant.

24 Claims, 9 Drawing Sheets

(51) Int. Cl.
*G02B 5/20* (2006.01)
*G02B 5/28* (2006.01)
*G02B 27/09* (2006.01)
*G02B 5/00* (2006.01)
*G02B 5/22* (2006.01)

(52) U.S. Cl.
CPC ............. *G02B 5/206* (2013.01); *G02B 5/208* (2013.01); *G02B 5/223* (2013.01); *G02B 5/281* (2013.01); *G02B 27/0927* (2013.01)

(58) Field of Classification Search
USPC ........ 359/359, 232–233, 738–740, 587, 894, 359/888
See application file for complete search history.

(56) References Cited

U.S. PATENT DOCUMENTS

| | | | |
|---|---|---|---|
| 6,449,081 B1 | 9/2002 | Onuki et al. | |
| 6,747,805 B2* | 6/2004 | Sayag | G02B 7/027 348/340 |
| 7,099,555 B2 | 8/2006 | Onuki et al. | |
| 8,953,249 B2 | 2/2015 | Inomoto et al. | |
| 2010/0188737 A1* | 7/2010 | Terada | G02B 5/282 359/359 |
| 2010/0258752 A1* | 10/2010 | Mochizuki | B32B 3/266 250/515.1 |
| 2010/0259824 A1* | 10/2010 | Mitsuhashi | G02B 5/205 359/585 |

FOREIGN PATENT DOCUMENTS

| | | |
|---|---|---|
| JP | 11-231209 | 8/1999 |
| JP | 2003-124449 | 4/2003 |
| JP | 2005-215225 | 8/2005 |
| JP | 2006-301221 | 11/2006 |
| JP | 2010-156765 | 7/2010 |
| TW | 201003151 A1 | 1/2010 |
| WO | WO 03/009040 A1 | 1/2003 |
| WO | WO 2007/075826 A2 | 7/2007 |
| WO | WO 2007/075826 A3 | 7/2007 |

* cited by examiner

PRIOR ART

OPTICAL ELEMENT

CROSS-REFERENCE TO RELATED APPLICATION

This application is a continuation application filed under 35 U.S.C. 111(a) claiming the benefit under 35 U.S.C. 120 and 365(c) of PCT International Application No. PCT/JP2013/061802 filed on Apr. 22, 2013, which is based upon and claims the benefit of priority of Japanese Priority Application No. 2012-101834 filed on Apr. 26, 2012 and Japanese Priority Application No. 2013-038498 filed on Feb. 28, 2013 and the entire contents of which are hereby incorporated by reference.

BACKGROUND OF THE INVENTION

1. Field of the Invention

The present invention relates to an optical element.

2. Description of the Related Art

In an optical device such as a camera or the like, a diaphragm, a neutral density (ND) filter or the like is used in order to adjust an amount of light that enters into a lens or the like. Recently, a camera is mounted on a mobile phone, a mobile terminal or the like so that a diaphragm is used in such a camera (Patent Document 1, for example).

FIG. 1 illustrates a general diaphragm. A diaphragm 910 includes a tabular member made of a shading material and provided with an open portion 911 at a center portion. Thus, in the diaphragm 910, light is shaded at a peripheral portion and transmitted at the center portion where the open portion 911 is formed. In FIG. 1, (a) is a top view of the diaphragm 910 and (b) illustrates transmittance of light along a dashed line 1A-1B in (a).

Recently, the size of each camera is becoming smaller in accordance with a smaller size and a thinner size of each mobile phone or each mobile terminal. Thus, the size of each diaphragm is also becoming smaller. However, in the small-size diaphragm 910, generation of diffraction of light at the periphery of the open portion 911 cannot be ignored so that it is becoming difficult to increase resolution. This means that, a small-size diaphragm is required in which resolution is not deteriorated even with a camera with high-pixels.

[Patent Document]

[Patent Document 1] Japanese Laid-open Patent Publication No. 2006-301221

SUMMARY OF THE INVENTION

The present invention is made in light of the above problems, and provides an optical element in which transmittance of light monotonically decreases from a center portion toward a peripheral portion.

According to an embodiment, there is provided an optical element in which transmittance of light monotonically decreases from a center portion toward a peripheral portion, the optical element including an absorbing material portion made of a material that absorbs a part of light and formed such that its thickness monotonically increases from the center portion toward the peripheral portion; and a transparent material portion made of a material that transmits light and is stacked on the absorbing material portion, a total thickness of the absorbing material portion and the transparent material portion being substantially constant.

According to the present invention, an optical element is provided in which transmittance of light monotonically decreases from a center portion toward a peripheral portion.

Further, in the optical element of the invention, an absorbing material portion and a transparent material portion are stacked and a total thickness of the absorbing material portion and the transparent material portion is substantially constant. Compared with a case in which the transparent material portion is not stacked, the optical element of the invention does not have an optical function other than light reduction. Thus, the optical element of the invention can be used without causing a side effect of diffusing light even when it is inserted within an optical path or taken out from the optical path.

DETAILED DESCRIPTION OF THE PREFERRED EMBODIMENTS

Figure 1:
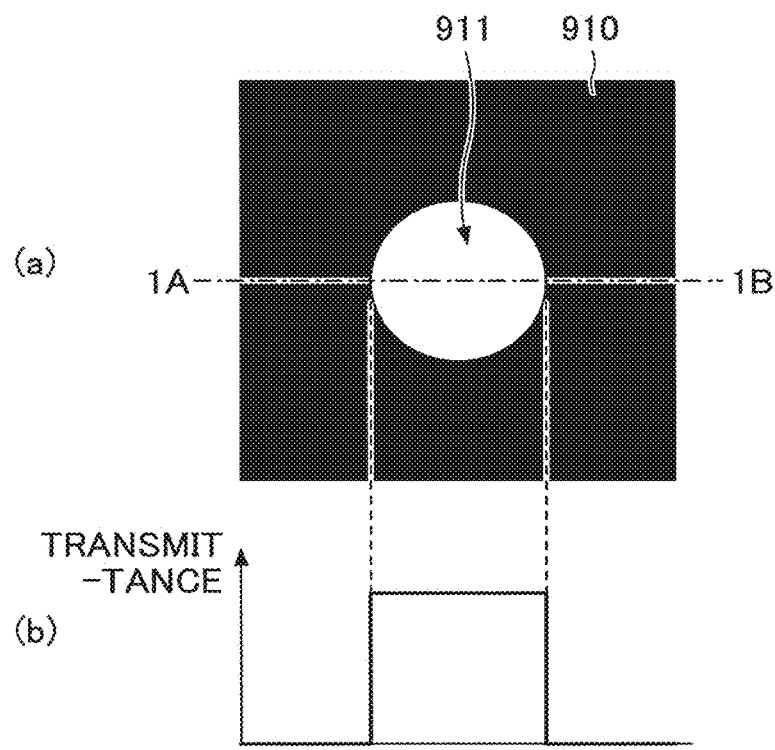
FIG. 1 is a view for explaining a diaphragm.
Figure 2:
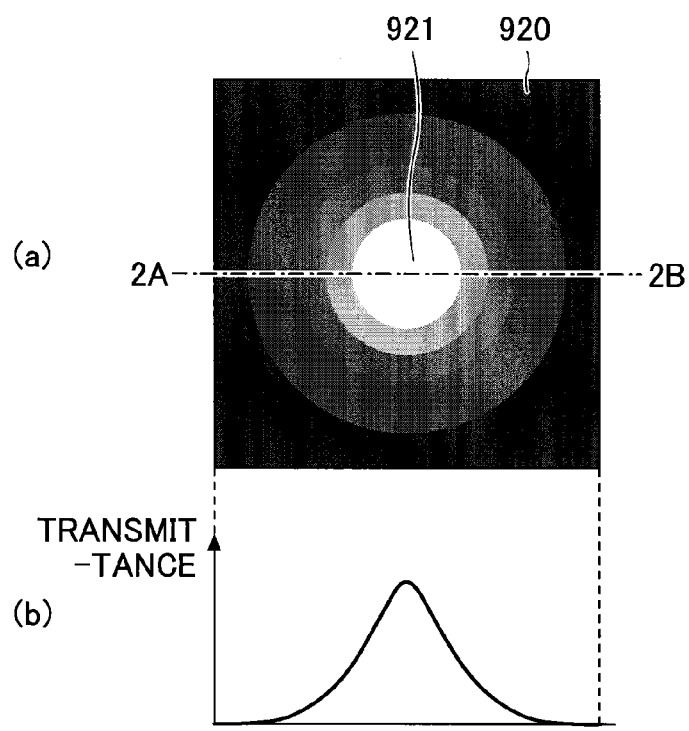
FIG. 2 is a view for explaining an apodizing filter.

This invention is accomplished in consideration of the problems described above, and it is an object of the present invention to provide an optical element that monotonically reduces transmittance of light from the center portion toward the peripheral portion as illustrated in FIG. 2.

(Optical Filter)

Figure 3:
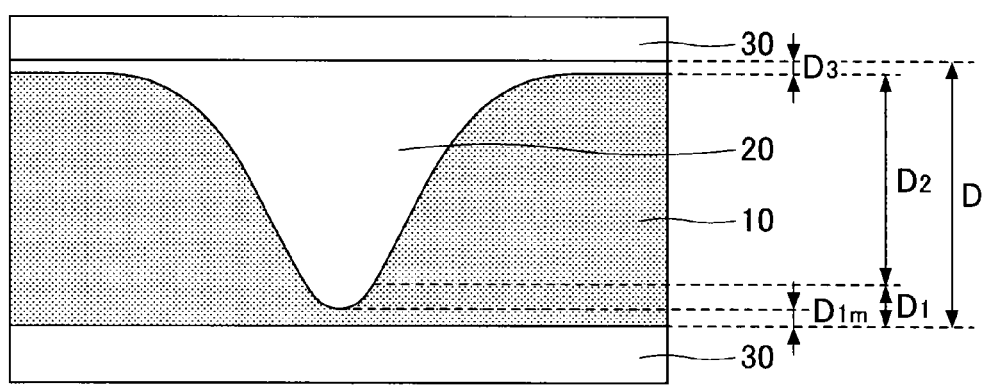
FIG. 3 is a structural view of an optical filter of an embodiment.

An optical element of the embodiment is explained with reference to FIG. 3. The optical element of the embodiment is an optical filter, in other words, a so-called "apodizing filter". Specifically, the optical filter includes an absorbing material portion 10 made of a material that absorbs visible light and a transparent material portion 20 made of a material that transmits visible light.

In the optical filter of the embodiment, the absorbing material portion 10 is formed such that its thickness $D_1$ continuously and gradually increases from a center portion toward a peripheral portion. By forming the absorbing material portion 10 such that the thickness $D_1$ gradually becomes thicker as such, the amount of light absorbed by the absorbing material portion 10 also gradually increases and the amount of light that transmits the optical filter gradually decreases. With this, the optical filter is formed such that transmittance continuously and gradually decreases from the center portion toward the peripheral portion. Specifically, for example, the optical filter may be formed such that the transmittance of the absorbing material portion 10 conforms Gaussian distribution from the center portion toward the peripheral portion.

Here, in this embodiment, the visible light means light whose wavelength is within a range of 380 nm to 700 nm. Further, the optical element of the embodiment may have a structure in which the absorbing material portion 10 and the transparent material portion 20 are formed on a base material such as a substrate or the like.

Further, the optical filter of the embodiment may have a structure in which the transparent material portion 20 is formed to fill a concave portion where the thickness of the absorbing material portion 10 is thin. Thus, the transparent material portion 20 may include a part having a thickness $D_2$ formed in the concave portion from an end portion of the absorbing material portion 10 and a part having a thickness $D_3$ that is formed on the end portion of the absorbing material portion 10. The optical filter is formed such that the thickness D, which is a total of the thickness $D_1$ of the absorbing material portion 10 and the thicknesses $D_2$ and $D_3$ of the transparent material portion 20, becomes substantially constant. Namely, $D=D_1+D_2+D_3$, and the optical filter is formed such that a difference between the maximum value of D and the minimum value of D in the optical filter becomes less than or equal to 5 µm, and more preferably, less than or equal to 1 µm. Thus, one surface and the other surface of the optical filter are substantially in parallel with each other. Further, it may be formed that the thicknesses $D_1$ and $D_3$ are zero, respectively.

Further, the optical filter of the embodiment is configured to transmit the light at the center portion so that a thickness $D_{1m}$ of the absorbing material portion 10 at the center portion becomes less than or equal to 0.5 µm. Namely, the optical filter is formed such that $D_{1m} \leq 0.5$ µm. This is because as a part of light is absorbed by the absorbing material portion 10, if the absorbing material portion is formed to be greater than or equal to 0.5 µm, transmittance of light that passes the center portion cannot be highly retained. The thickness $D_{1m}$ indicates a thickness of a portion at which the thickness $D_1$ is thinnest in the absorbing material portion 10. Further, when a distance from the center is referred to as "X", the thickness $D_1$ of the absorbing material portion 10 increases and transmittance decreases in accordance with increasing "X" from the center portion toward the end portion. It is preferable that the transmittance is given by a Gaussian function, and is explained in the following.

$$f(x) = \exp\left(\frac{-x^2}{2\sigma^2}\right) \quad \text{[Equation 1]}$$

In Equation 1, "σ" is a real number. "σ" may be determined by a half-value width of the transmittance, and, for example, when the radius is 1 mm and the transmittance is 50%, "σ" may be 0.85.

Further, greater than or equal to two of the optical filters of the embodiment may be used to form a single optical filter. For example, a plurality of the optical filters of the embodiment of different aperture sizes may be manufactured on a support substrate, which will be explained later, the structure including the plurality of optical filters of different aperture sizes may be placed in an optical path, and then a desired aperture diameter can be selected by driving the plurality of optical filters.

These may be arbitrarily varied based on an optical design. Further, for an absorbing material portion of any shape, by stacking a transparent material portion on the absorbing material portion, the optical filter can be obtained in which a total thickness of the absorbing material portion and the transparent material portion is substantially constant.

A region at which transmittance of visible light is higher than 1% is referred to as an "effective region" of the optical filter of the embodiment.

Further, the optical filter of the embodiment is configured such that an optical function other than light reduction (neutral density) does not work. Thus, it is configured that the total thickness of $D_1$ and $D_2$ is constant regardless of "X" (the distance from the center).

Further, it is preferable that refractive index $n_1$ of a material that composes the absorbing material portion 10 and refractive index $n_2$ of a material that composes the transparent material portion 20 become substantially equal. In other words, it is preferable that $|n_1-n_2| \leq 0.1$ is satisfied, and more preferably, $|n_1-n_2| \leq 0.05$ is satisfied. Although the refractive index varies in accordance with wavelength, it is preferable that the refractive index satisfies $|n_1-n_2| \leq 0.1$, and more preferably, satisfies $|n_1-n_2| \leq 0.05$ within the wavelength bandwidth of use. Further, it is preferable that materials whose rate of change in refractive index in accordance with temperature are substantially equal are used as the materials that compose the absorbing material portion 10 and the material that composes the transparent material portion 20. In such a case, the refractive index $n_1$ of the material that composes the absorbing material portion 10 and the refractive index $n_2$ of the material that composes the transparent material portion 20 becomes substantially equal even when periphery temperature varies. It is preferable that $|dn_1/dT - dn_2/dT|$ is less than or equal to 100 ppm/K, and more preferably, less than or equal to 20 ppm/K. In such a case, although different layers of the absorbing material portion 10 and the transparent material portion 20 are stacked, the refractive indexes can be substantially equal even when the temperature varies and the refraction of light at an interface of the stacked layers can be suppressed. Further, in this embodiment, the rate of change in refractive index in accordance with temperature may be referred to as a "temperature coefficient of refractive index" as well.

Further, the optical filter of the embodiment is formed such that a product of the refractive index $n_1$ and the thickness $D_1$ of the material that forms the absorbing material portion 10 becomes substantially equal to a product of the refractive index $n_2$ and the thickness $D_2$ of the material that forms the transparent material portion 20. This means that "P", which is defined as $P = n_1 \times D_1 + n_2 \times D_2 + n_3 \times D_3$, becomes substantially constant regardless of "X". "P" indicates an optical path length, and it is preferable that difference in optical path lengths is less than or equal to wavelength (also referred to as "λ") within the effective region of the optical filter of the embodiment. Here, when an antireflection film, which will be explained in the following, is formed, the optical path length of the optical filter becomes longer for an amount corresponding to the antireflection film. However, even in such a case, it is preferable that the difference in optical path lengths is less than or equal to "λ" within the effective region.

Further, in the optical filter of the embodiment, an antireflection film 30 is formed on one surface or both surfaces of the optical filter. In FIG. 3, an example is illustrated in which the antireflection films 30 are formed at both surfaces of the optical filter. Alternatively, the antireflection film 30 may be formed at one surface of the optical filter from which light enters. The antireflection film 30 may be, for example, formed by a dielectric multilayer film. It is preferable that reflectance of the antireflection film 30 is low at a wavelength region of 430 nm to 630 nm and the reflectance at such a wavelength region is less than or equal to 2%.

Further, it is preferable that the antireflection film 30 reflects light whose wavelength is less than 380 nm and transmits light whose wavelength is greater than or equal to 380 nm. As will be described later, it is preferable that the optical element of the embodiment includes an organic material. However, the organic material may be deteriorated easily by ultraviolet light. Thus, by reflecting the light whose wavelength is less than 380 nm by the antireflection film 30, the deterioration of the optical element of the embodiment by the light can be suppressed. Further, although a position at which the optical element of the embodiment is placed is not limited, an advantage that the optical element of the embodiment may suppress deterioration of another optical component caused by ultraviolet light.

Figure 4A:
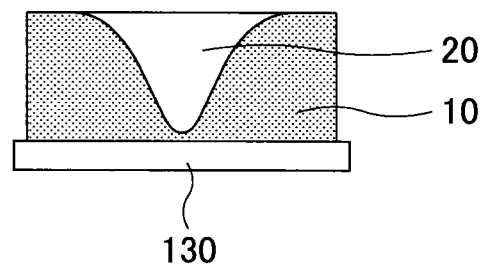
FIG. 4A to FIG. 4C are views for explaining the optical filter manufactured by a method of manufacturing the optical filter of the embodiment.
Figure 4B:
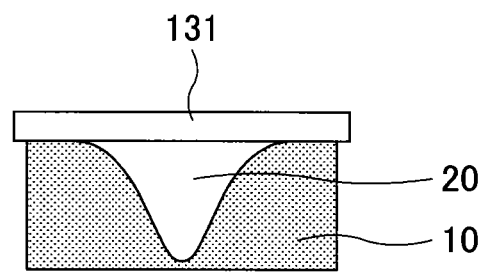
Figure 4C:
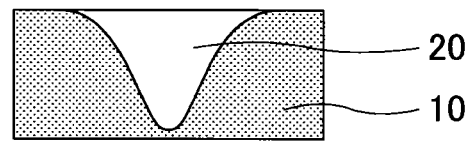

Further, the optical filter of the embodiment may be stacked on a resin film that transmits visible light. For example, FIG. 4A illustrates an example in which the absorbing material portion 10 is stacked on a resin film 130. FIG. 4B illustrates an example in which the transparent material portion 20 is stacked on a resin film 131. As will be explained later, as the absorbing material portion 10 preferably includes an inorganic dye, there may be a case when thermal expansion coefficient of the absorbing material portion 10 becomes less than that of the transparent material portion 20. When two material portions whose coefficients of thermal expansion are different are stacked, there is a problem that a warp may be generated. This means that compared to a case as illustrated in FIG. 4C, when a film is used as illustrated in FIG. 4A and FIG. 4B, the amount of warp can be reduced. For example, by using a film whose thermal expansion coefficient is larger than that of the absorbing material portion 10 for the case illustrated in FIG. 4A, and by using a film whose thermal expansion coefficient is smaller than that of the transparent material portion 20 for the case illustrated in FIG. 4B, the amount of warp can be effectively reduced.

Further, a resin film with a good thermal-resisting property may be used. In such a case, another advantage, different from the thermal expansion, may be obtained. In other words, when a thermal treatment is necessary when manufacturing a component including the optical filter, the film can function as a support substrate with a good thermal-resisting property. Thus, deformation of the optical filter can be suppressed. For such a film, a film whose glass transition point is higher than those of the absorbing material portion 10 and the transparent material portion 20 is preferably used.

An example of a method of manufacturing the optical filter of the embodiment is explained later with reference to (a) to (e) of FIG. 7. In manufacturing steps, it is preferable that the resin film has a high rigidity, and is hard to be deformed. If the resin film is deformed to have a concaved shape when molding, unintended optical functions may be added so that there may be a case that control of lenses in a camera becomes complicated. Further, it is preferable that the optical filter of the embodiment is easy to handle as an optical component. In this point of view as well, it is preferable that the resin film has a high rigidity, and it is preferable that Young's modulus of the resin film is greater than or equal to 1.0 GPa, and more preferably, greater than or equal to 2.0 GPa.

Further, it is preferable that an absolute value of the difference between the refractive index of the resin film and the refractive index of the transparent material portion 20 is small because it means reflectance at an interface of them is low. Thus, the transmittance of the optical filter of the embodiment can be high. It is preferable that the absolute value of the difference between the refractive index of the resin film and the refractive index of the transparent material portion 20 is less than or equal to 0.1, and more preferably, less than or equal to 0.05. Although the refractive index varies in accordance with wavelength, it is preferable that an absolute value of the difference between refractive indexes within the visible wavelength bandwidth is less than or equal to 0.1, and more preferably, less than or equal to 0.05.

Further, it is preferable that an absolute value of the difference between the refractive index of the resin film and the refractive index of the absorbing material portion 10 is small because it means reflectance at an interface of them is low. Thus, the transmittance of the optical filter of the embodiment can be high. It is preferable that the absolute value of the difference between the refractive index of the resin film and the refractive index of the transparent material portion 20 is less than or equal to 0.1, and more preferably, less than or equal to 0.05. Although the refractive index varies in accordance with wavelength, it is preferable that an absolute value of the difference between refractive indexes within the visible wavelength bandwidth is less than or equal to 0.1, and more preferably, less than or equal to 0.05.

Further, for the optical filter of the embodiment, it is preferable that a difference in optical path lengths is less than or equal to "$\lambda$" within the effective region. When a resin film is used, the optical path length becomes longer than the above described "P" for an amount corresponding to the refractive index and the thickness of the resin film so that the optical path length of the optical filter becomes longer. However, even in such a case, it is preferable that the difference in optical path lengths is less than or equal to "$\lambda$" within the effective region. Although the optical filter of the embodiment may have a plurality of structures, not limited to a specific one embodiment, in any structures, it is preferable that the difference in optical path lengths is less than or equal to "$\lambda$" within the effective region.

Figure 5:
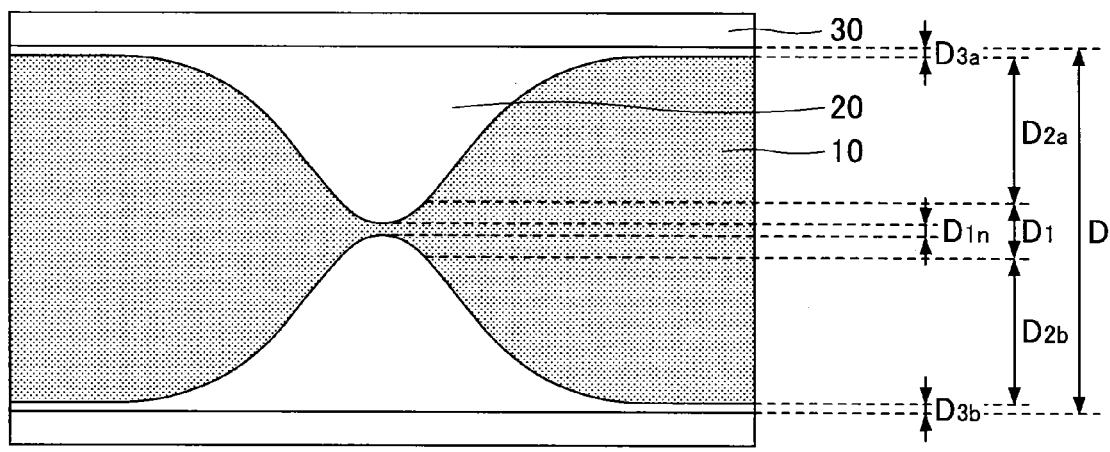
FIG. 5 is a view for explaining the optical filter manufactured by the method of manufacturing the optical filter of the embodiment.

Further, in the optical filter of the embodiment, as illustrated in FIG. 5, the absorbing material portion 10 may be configured such as to have a structure in which two concave structures are stacked. In this structure, the absorbing material portion 10 is not necessarily symmetric in a thickness direction. In other words, $D_{2a}$ and $D_{2b}$ may not necessarily be equal and similarly, $D_{3a}$ and $D_{3b}$ may not necessarily be equal.

In such a case as well, the optical filter of the embodiment is formed such that a product of the refractive index $n_1$ and the thickness $D_1$ of the material that composes the absorbing material portion 10 and a product of the refractive index $n_2$ and the thickness $D_2$ of the material that composes the transparent material portion 20 becomes substantially constant. This means that, "P", which is defined as $P=n_1 \times D_1 + n_2 \times D_2 + n_3 \times D_3$, becomes substantially constant regardless of "X". Here, D2=D2a+D2b and D3=D3a+D3b.

Further, the optical filter may be formed on a resin film or a glass substrate that may be used as a support substrate.

Further, in addition to using the optical filter independently as described above, the optical filter may be stacked on another arbitrary component in a camera module. For example, the optical filter may be used by stacking on a cover glass, a lens or an infrared cut filter. By using as such, the number of components in the camera module can be reduced.

For the cover glass, a white sheet glass, a chemically strengthened glass or the like is preferably used. For the white sheet glass, a crown glass, a borosilicate glass or the like in which the amount of impurities such as iron on the like is small may be used. For the chemically strengthened glass, an aluminosilicate glass or a soda-lime glass whose surface is performed with an ion-change process may be used. Further, other than glasses, a ceramic material that is transparent within a visible range such as sapphire or the like, a resin material that is transparent within the visible range may also be used. For the resin material, polycarbonate resin, acrylic resin or the like is preferably used.

A dielectric multilayer film that transmits visible light and reflects infrared light or ultraviolet light, or an antireflection film that transmits visible light may be stacked on the cover glass. The dielectric multilayer film has a structure in which a low refractive index material and a high refractive index material are alternately stacked with each other. For the low refractive index material, silicon oxide ($SiO_2$), magnesium fluoride ($MgF_2$) or the like may be used. For the high refractive index material, titanium oxide ($TiO_2$), niobium oxide ($Nb_2O_5$), tantalum oxide ($Ta_2O_5$), zirconium oxide ($ZrO_2$) or the like may be used. Further, a layer of a middle refractive index material may be inserted between layers of the low refractive index material and the high refractive index material. For the middle refractive index material, aluminum oxide ($AlO_3$) or the like may be used. For the antireflection film, the above described low refractive index material, the high refractive index material or the middle refractive index material may be used. It is preferable to use a stacked structure of a plurality of layers because reflectance can be made lower.

Further, a coating for preventing contamination or adhesion of fingerprints may be provided at an opposite surface. For such a material, a material whose surface energy is low is preferably used, and a fluorine-based material, a silicone-based material or a fluorosilicone-based material may be used. In particular, it is preferable to use perfluoropolyethersilane. The coating may be directly applied on the cover glass, or may be applied on an antireflection film after forming the antireflection film on the cover glass. A surface at which the coating is applied is positioned outside and a surface on which the optical filter of the embodiment is stacked is positioned inside. Here, inside means a side closer to a solid-state image sensing device, which will be explained in the following.

Next, the infrared cut filter is also referred to as an "infrared cut-off filter" and is a filter for color correction that cuts near infrared wavelength. The infrared cut filter is used for color correction of a complementary metal-oxide semiconductor (CMOS) or a solid-state image sensing device such as a charge coupled device (CCD) or the like, and there are a plurality of methods. For example, a phosphoric acid-based glass or a fluorophosphate-based glass including $Cu^{2+}$ ion is preferably used that absorbs light whose wavelength is greater than or equal to about 700 nm. The phosphoric acid-based glass includes $P^{5+}$ as a major constituent of cations and may include alkali metal ions ($Li^{+}$,$Na^{+}$,$K^{+}$), alkali earth metal ions ($Mg^{2+}$, $Ca^{2+}$, $Sr^{2+}$,$Ba^{2+}$), $Al^{3+}$, $Zn^{2+}$ or the like. The phosphoric acid-based glass includes $O^{2-}$ as a major constituent of anions. Further, the fluorophosphate-based glass includes $F^-$ in addition to the above described anions. The ions included in the phosphoric acid-based glass or the fluorophosphate-based glass are not limited to the above described examples and other ionic species may be included.

For another method, there is a method of using a dielectric multilayer film that transmits visible light and reflects infrared light. The dielectric multilayer film is designed such that the reflectance of infrared light whose wavelength is greater than or equal to about 700 nm is high and the infrared light can be cut-off. The dielectric multilayer film is formed on a substrate such as a glass or the like that is transparent within the visible range.

Further, for another method, there is a method in which the above described dielectric multilayer film and a dye is combined. Generally, the dielectric multilayer film is designed to cut-off the infrared light whose wavelength is greater than or equal to about 700 nm. However, if the angle-of-incidence of light shifts from a perpendicular direction with respect to the dielectric multilayer film, the wavelength that the dielectric multilayer film can cut-off shifts to a shorter wavelength side. When it is assumed that an angle of light that enters from the perpendicular direction is angle-of-incidence zero, when the angle-of-incidence is small, the reflectance of light whose wavelength is about 700 nm is high. However, if the light enters from an inclined direction and the angle-of-incidence becomes large, the reflectance becomes low. In other words, there is a case that the reflectance varies in accordance with the angle-of-incidence. In order to improve this, the dielectric multilayer film is used with a combination with a material whose angle-of-incidence dependency is small, in other words, an absorbing material. For such an absorbing material, a dye that has absorption around 700 nm is preferably used, and it is preferable that resin including the dye is used with the dielectric multilayer film in combination. The dielectric multilayer film may be formed on the resin, or may be formed on a substrate such as a glass or the like that is transparent within the visible range. For the latter case, the resin is formed at a surface opposite to the surface at which the dielectric multilayer film is formed. For the absorbing material that is used in combination with the dielectric multilayer film, in addition to the dye, the above described phosphoric acid-based glass, the fluorophosphate-based glass that includes $Cu^{2+}$ ion may be used. Further, a dielectric multilayer film that reflects ultraviolet light, an antireflection film that transmits visible light may be used in combination with the infrared cut filter.

For the lens, a glass lens or a plastic lens is preferably used. Generally, a plurality of convex lenses and concave lenses are used in a camera module. The optical element of the embodiment may be stacked on an arbitrary lens in the camera module. For example, a convex portion of the lens may be assumed as the transparent resin of the optical element of the embodiment, and the absorbing material may be stacked on the convex portion. Further, the absorbing material portion and the transparent resin may be stacked on a plane surface side of a plano-convex lens or a plano-concave lens.

Further, an antireflection film may be stacked on the lens. The antireflection film may be formed on the optical element of the embodiment after stacking the optical element of the embodiment on the lens, the antireflection film may be formed at a surface at which the optical element of the embodiment is not stacked, or the antireflection films may be stacked on both the optical element of the embodiment and the surface at which the optical element of the embodiment is not stacked.

(Absorbing Material Portion)

The absorbing material portion of the embodiment is obtained by including "(A) an absorbing material" in "(B) transparent resin".

(A) Absorbing Material

For the absorbing material, an organic dye or an organic dye such as anthraquinone-based, phthalocyanine-based, benzimidazolone-based, quinacridone-based, azochelate-based, azo-based, isoindolinone-based, pyranthrone-based, indanthrone-based, anthrapyrimidine-based, dibromoanthanthrone-based, flavanthrone-based, perylene-based, perinone-based, quinophthalone-based, thioindigo-based, dioxazine-based, aniline black, nigrosine black or the like, a metal nano particle such as gold, silver, copper, tin, nickel, palladium or alloys of these, or an inorganic dye such as barium sulfate, zinc oxide (zinc flower), lead sulfate, chrome yellow, iron red, ultramarine blue dye, iron blue, chromium oxide, black iron oxide, red lead, zinc sulfide, cadmium yellow, cadmium red, zinc, manganese violet, cobalt, magnetite, carbon black, carbon nanotube, graphene, titan black, multiple oxide composed of copper.iron.manganese or the like, may be used. In particular, titan black is preferably used as it has good dispersibility and high absorption coefficient. As the density of titan black added to the transparent resin, which will be explained later, can be low, viscosity can be retained low.

Here, titan black is a low-dimensional titanium oxide compound expressed as TiNxOy ($0 \leq x < 1.5$ and $0.16 < y < 2$) or ($1.0 \leq x+y < 2.0$ and $2x < y$), and its particle can be easily obtained. When used in the optical element, it is preferable that a haze value is small. Thus, it is preferable that an average particle size of the titan black particle of the embodiment is less than or equal to 100 nm, and more preferably, less than or equal to 30 nm. The average particle size means a primary particle size of titan black particles included in an organic solvent obtained by a transmission electron microscope (TEM), and is a number average particle size of 100 particles.

In this embodiment, when particles are used, a dispersing agent may be used. Thus, a dispersing agent may be used for titan black. The dispersing agent is used for evenly dispersing the particles in resin. For the dispersing agent, a high-molecular dispersing agent (alkylammonium salt, alkylolammonium salt that is a copolymer including acid radical), hydroxyl group containing carboxylate, carboxylic acid containing copolymer, amide group containing copolymer, a dye derivative, a silane coupling agent or the like may be used. Further, the dispersing agent may include a functional group that interacts with resin of a polymerizable functional group in its molecular. Further, these may be independently used or greater than or equal to two of these may be used in combination.

It is preferable that the ratio of titan black in the resin is greater than or equal to 0.3 wt. % and less than or equal to 15 wt. %, and more preferably, between 0.5 wt. % to 13 wt. %. This corresponds that an OD value at 10 μm is greater than or equal to 0.2 and less than or equal to 4.0. When the ratio is less than 0.3 wt. %, the thickness of greater than or equal to 100 μm is necessary in order to actualize desired transmittance so that molding may be very difficult. On the other hand, when the ratio is greater than 15 wt. %, decreasing of transmittance per thickness unit becomes large and it becomes essential that the remaining thickness at the center portion becomes almost zero. In such a case, it is very difficult to manufacture the optical element.

Other materials may be added in addition to titan black. In particular, for carbon black, transmittance monotonically decreases from 700 nm toward 380 nm. As this characteristic is opposite to that of titan black, by combining titan black and carbon black, wavelength dependency of transmittance can be smaller.

The carbon black used in this embodiment is not specifically limited, however, particles synthesized by incomplete combustion or heat decomposition may be used. Among them, carbon black synthesized by a channel process, which is a kind of incomplete combustion, is preferably used because it includes a lot of functional groups at surface and easy to be dispersed evenly in resin.

When used in the optical element, it is preferable that a haze value is small. Thus, it is preferable that an average particle size of the carbon black particle of the embodiment is less than or equal to 500 nm, and more preferably, less than or equal to 200 nm. The average particle size means a primary particle size of carbon black particles included in organic solvent obtained by a transmission electron microscope (TEM), and is a number average particle size of 100 particles.

It is preferable that the ratio of carbon black in the resin is evenly than or equal to 0.3 wt. % and less than or equal to 15 wt. %, and more preferably, evenly than or equal to 0.5 wt. % and less than or equal to 13 wt. %. When the ratio is less than 0.3 wt. %, the thickness of evenly than or equal to 100 μm is necessary in order to actualize desired transmittance so that molding may be very difficult. On the other hand, when the ratio is evenly than 15 wt. %, decreasing of transmittance per thickness unit becomes large and it becomes essential that the remaining thickness at the center portion becomes almost zero. In such a case, it is very difficult to manufacture the optical element.

Further, by controlling the ratio of carbon black and the above described titan black, wavelength dependency of transmittance, which will be explained later, can be controlled. It is preferable that the mass ratio of titan black and carbon black (mass of titan black/mass of carbon black) is between 0.5 to 3.0, and more preferably, between 0.8 to 2.0.

In the optical filter of the embodiment, it is preferable that wavelength dispersion of transmittance is small. Here, the wavelength dispersion of transmittance is defined as an absolute value of a difference between transmittances at wavelength 450 nm and wavelength 650 nm, in other words, it is defined as $|T_{450}-T_{650}|$. It is preferable that this is less than or equal to 5%, and more preferably, less than or equal to 1%. For example, it is assumed that transmittances measured at a single point in the optical device at wavelength 450 nm and wavelength 650 nm are $T_{450}=55\%$ and $T_{650}=50\%$, respectively. At this time, the wavelength dispersion of transmittance is $|55\%-50\%|=5\%$. Here, it is assumed that an average value of transmittances from wavelengths 380 nm to 700 nm is referred to as "transmittance of visible light". It is preferable that $|T_{450}-T_{650}|$ satisfies the above condition within a range in which the transmittance of visible light is from 40% to 80%.

Further, in the optical filter of the embodiment, it is preferable that a haze value is small. It is preferable that the haze value becomes less than or equal to 10%, and more preferably, less than or equal to 5%, when total light transmittance Tt is 10%, by adjusting a material that has absorption within the visible range.

(B) Transparent Resin

For the transparent resin material, thermoplastic resin such as polyethylene terephthalate (PET), polyethylene naphthalate (PEN), polybutylene terephthalate (PBT), polycarbonate (PC), cycloolefin (COP) or the like, thermosetting resin such as polyimide (PI), polyether imide (PEI), polyamide (PA), polyamide-imide (PAI) or the like, or energy-ray-curable resin such as acryl, epoxy or the like may be used. When the thermosetting resin or the energy-ray-curable resin is used, the absorbing material may be added in a polymeric precursor compound (hereinafter, referred to as "polymerizable compound" as well) such as oligomer, monomer or the like, and may be cured thereafter. Among these, the energy-ray-curable resin is preferably used. Such a polymerizable compound is not specifically limited as long as the compound is capable of being cured by a polymerization reaction. For example, not specifically limited, radical polymerizable resin, cationic polymerizable resin, or radical polymerizable compound (monomer) may be used. Among these, radical polymerizable compound (monomer) is preferably used in point of views of polymerization speed or moldability, which will be explained later. For the radical polymerizable resin, resin including a double bond of carbon-carbon such as (meth)acryloyloxy group, (meth)acryloylamino group, (meth)acryloyl group, allyloxy group, allyl group, vinyl group, vinyloxy group or the like may be used.

The polymerizable compound used in this embodiment is not specifically limited, but a monofunctional compound such as ethoxylated o-phenylphenolacrylate, methacrylic acid 2-(perfluorohexyl)ethyl, cyclohexyl(meth)acrylate, isobornyl(meth)acrylate, tricyclodecane(meth)acrylate, tricyclodecanemethanol(meth)acrylate, tricyclodecaneethanol(meth)acrylate, 1-adamantylacrylate, 1-adamantylmethanolacrylate, 1-adamantylethanolacrylate, 2-methyl-2-adamantylacrylate, 2-ethyl-2-adamantylacrylate, 2-propyl-2-adamantylacrylate or the like, a difunctional compound such as 9,9-bis[4-(2-acryloyloxyethoxyl)phenyl]fluorene, diethyleneglycoldi(meth)acrylate, 1,3-butanedioldi(meth)acrylate, 1,4-butanedioldi(meth)acrylate, neopentylglycoldi(meth)acrylate, isobornyldi(meth)acrylate, tricyclodecanedi(meth)acrylate, tricyclodecanedimethanoldi(meth)acrylate, tricyclodecanediethanoldi(meth)acrylate, adamantanediacrylate, adamantanedimethanoldiacrylate or the like, a trifunctional compound such as trimethylolpropantri(meth)acrylate or the like, a tetrafunctional compound such as pentaerythritol tetra(meth)acrylate or the like, a hexafunctional compound such as dipentaerythritolhexa(meth)acrylate or the like may be used. A single polymerizable compound or greater than or equal to two polymerizable compounds may be included. When only a monofunctional compound is used, there may be a case that a cohesive failure occurs when releasing the compound after molding. Thus, it is preferable that a multifunctional compound greater than or equal to bifunctional is included. It is preferable that the ratio of the multifunctional compound within the polymerizable compound is greater than or equal to 1 wt. % and less than or equal to 90 wt. %, and more preferably, greater than or equal to 10 wt. % and less than or equal to 80 wt. %. If the amount of the multifunctional compound is less than 1 wt. %, an effect of improving the cohesive failure is insufficient. If the amount of the multifunctional compound is greater than 90 wt. %, shrinking after polymerization may be a problem.

Further, other than the above described functional groups including a double bond of carbon-carbon, a polymerizable compound such as an epoxy group that can cause a ring-opening reaction may be used. Although not specifically raised in an example, in such a case, it is preferable that a multifunctional compound greater than or equal to bifunctional is included because there may be a case that a cohesive failure occurs when releasing the compound after molding if only a monofunctional compound is included. It is preferable that the ratio of the multifunctional compound within the polymerizable compound is greater than or equal to 1 wt. % and less than or equal to 90 wt. %, and more preferably, greater than or equal to 10 wt. % and less than or equal to 80 wt. %. These absorbing material portions may be independently used greater than or equal to two of these may be used in combination for a purpose of reducing a difference in refractive indexes between a component on which the absorbing material portion is stacked and reducing refraction at an interface with the component or adjusting viscosity.

For a radical initiator used for an acrylic monomer, a photo radical initiator such as an oxime ester-based initiator, a titanocene-based initiator, an acetophenone-based initiator, a benzoin-based initiator, a benzophenone-based initiator, a thioxanthone-based initiator, an α-aminoketone-based initiator, an α-hydroxyketone-based initiator or the like, or a thermal radical initiator such as peroxide, an azo compound, a redox initiator or the like is used. Among them, the oxime ester-based initiator may be preferably used because of its high activity as an initiator.

These radical initiators may be independently used or greater than or equal to two kinds of radical initiators may be used in combination. It is preferable that the amount of the radical initiator with respect to the total amount of the polymerizable compound is 0.05 to 5 wt. %.

An example of the radical initiator preferably used in this embodiment is, for example, IRGACURE 784, IRGACURE OXE-01 or IRGACURE OXE-02 (manufactured by BASF Ltd.).

Further, various additive agents may be included in accordance with necessity. For the additive agents, antioxidant, photostabilizer, surfactant, photosensitizer, resin other than the above described polymerizable compounds, or the like may be used. For the antioxidant, phenol-based antioxidant, sulfur-based antioxidant, phosphorus-based antioxidant or the like may be used. For the photostabilizer, hindered amine-based photostabilizer (HALS) or the like may be used.

For the surfactant, any of anionic surfactant, cationic surfactant, amphoteric surfactant and nonionic surfactant may be used. Further, the surfactant may include fluorine atom.

The photocurable absorbing material of the embodiment may be adjusted by adding a dispersing agent and organic solvent to an absorbing particle, dispersing, adding a polymerizable compound, a radical initiator and other additive agents in accordance with necessity, and removing (distilling) the organic solvent by evaporation.

For dispersing, a ultrasonic homogenizer, a magnetic stirrer, a stirring rod with wing, a high-pressure emulsifier, a wet grinding mill, a sand-mill, a ball-mill or the like may be used.

The dispersing may be performed by using one of them or a plurality of them in combination for a plurality of times.

The organic solvent is not specifically limited as long as it can easily disperse the absorbing material using the dispersing agent and easily dissolve the polymerizable compound, the radical initiator and the other additive agents. For such organic solvent, alcohol group, ketone group, ester group, alkane group, aromatic group or the like is preferably used. For a specific example, methanol, ethanol, propanol, acetone, methyl ethyl ketone, methyl acetate, ethyl acetate, butyl acetate, cyclohexanone or the like may be used.

One of these organic solvents may be used or a combination of two or more of these organic solvents may be used.

The density in grinding is not specifically limited, but it is preferable that the density is within a range between 0.01 mg/mL to 10 mg/mL, and more preferably, within a range between 0.1 mg/mL to 5 mg/mL. When the density in grinding is lower than 0.01 mg/mL, it is not preferable because the above described evaporation process becomes complicated. Further, when the density in grinding is higher than 10 mg/mL, the particle may partially aggregate to cause haze.

Next, a method of manufacturing the photocurable absorbing material of the embodiment is explained with reference to FIG. 6.

Figure 6:
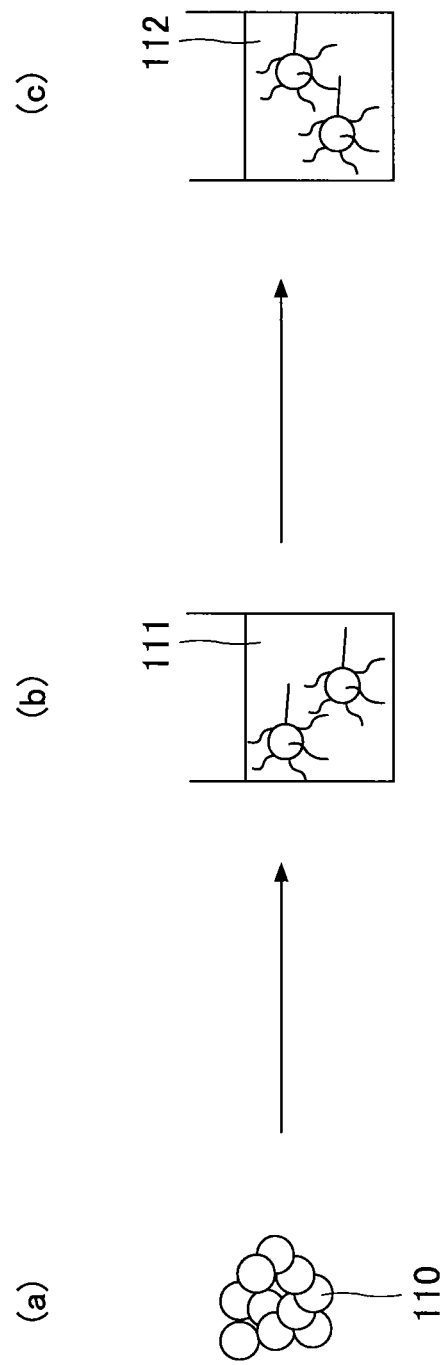
FIG. 6 is a view for explaining the method of manufacturing the optical filter of the embodiment.

First, a dispersing agent and organic solvent are added to an absorbing material particle 110 illustrated in (a) of FIG. 6. Then, ultrasonic is irradiated, and thereafter, zirconia beads are added. Then, by performing the dispersing process as described above, absorbing material dispersion liquid 111 as illustrated in (b) of FIG. 6 is obtained.

Next, after adding photocurable acrylate and a radical initiator to the absorbing material dispersion liquid 111 illustrated in (b) of FIG. 6, the organic solvent is removed and a photocurable absorbing material 112 illustrated in (c) of FIG. 6 is obtained. The photocurable absorbing material 112 obtained by adding the photocurable acrylate and the radical initiator is to be cured by irradiating ultraviolet light.

It is preferable that viscosity of the photocurable absorbing material 112 from which the solvent is removed is small to have good moldability. Specifically, it is preferable that the viscosity at 30° C. is greater than or equal to 30 mPa·s and less than 5000 mPa·s, and more preferably, greater than or equal to 50 mPa·s and less than 3500 mPa·s.

When the viscosity of the photocurable absorbing material at 30° C. is greater than or equal to 5000 mPa·s, it is difficult to obtain a uniform mold body because the amount of air introduced into the photocurable absorbing material becomes large so that bubbles are easily introduced in the mold body. On the other hand, when the viscosity of the photocurable absorbing material at 30° C. is less than 30 mPa·s, it is difficult to obtain a uniform mold body because drip easily occurs.

Further, in the optical filter of the embodiment, the refractive index of the absorbing material portion may be greater than or equal to 1.35 and less than or equal to 1.65. Here, the wavelength for this refractive index is 589 nm. Here, the refractive index of the absorbing material portion is substantially equal to the refractive index of the transparent material portion, and the refractive index of many of the general transparent materials is greater than or equal to 1.35 and less than or equal to 1.65, it is preferable that the refractive index of the absorbing material portion is within that range.

(Transparent Material Portion)

Next, the transparent material portion of the embodiment is explained. For the transparent resin used for the transparent material portion, the transparent resin described for the absorbing material portion may be used. Among them, energy-ray-curable resin is preferably used. Further, for a purpose of adjusting the refractive index, nano particles of inorganic oxide that is transparent in a visible wavelength region may be included. For such a material, $Al_2O_3$, $SiO_2$, $GeO_2$, $SnO_2$, $Y_2O_3$, $La_2O_3$, $CeO_2$, $TiO_2$, $ZrO_2$, $Nb_2O_5$, $Ta_2O_5$ or the like may be used.

Further, in order to reduce warp of the optical filter due to temperature variation, it is preferable that the coefficient of linear expansion of materials that compose the absorbing material portion and the transparent material portion is substantially the same. It is preferable that an absolute value of a difference in coefficients of linear expansion is less than or equal to 50 ppm/K, and more preferably, less than or equal to 10 ppm/K. The transparent material portion may be appropriately adjusted in accordance with the absorbing material portion.

(Method of Manufacturing Optical Filter)

A method of manufacturing the optical filter of the embodiment is explained with reference to FIG. 7.

Figure 7:
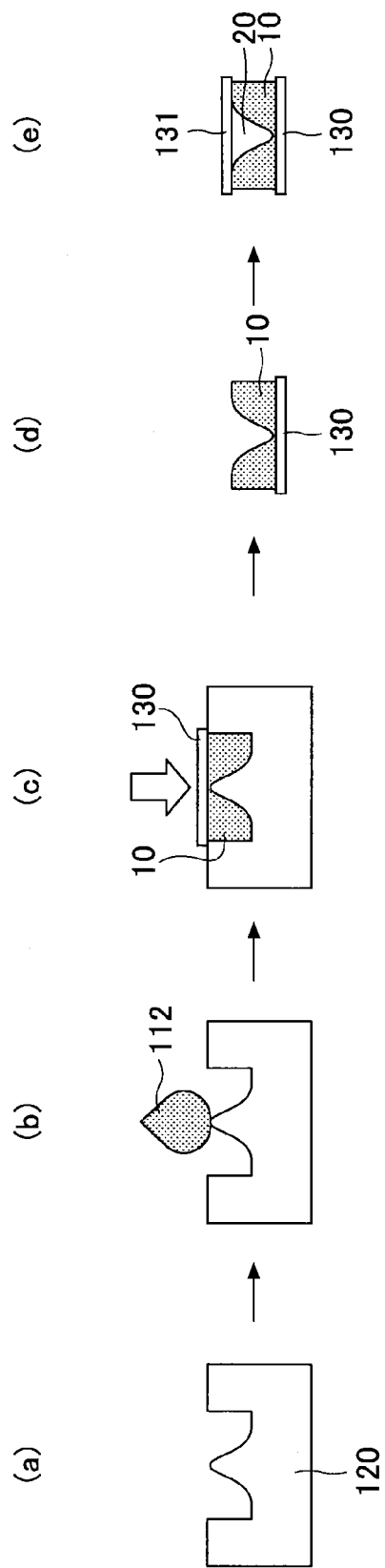
FIG. 7 is a view for explaining the method of manufacturing the optical filter of the embodiment.

As illustrated in (a) of FIG. 7, a quartz mold 120 made of quartz is prepared. The quartz mold 120 is provided with a convex portion at its center portion, and is provided with a concave portion at the periphery of the convex portion. Although a mold made of quartz is used in this example, a mold made of an optimum material may be used in point of views of moldability, ease of releasing or the like.

Next, as illustrated in (b) of FIG. 7, a predetermined amount of the photocurable absorbing material 112 as illustrated in (c) of FIG. 6 is dropped on the quartz mold 120.

Next, as illustrated in (c) of FIG. 7, a resin film 130 is covered on the dropped photocurable absorbing material 112 and the absorbing material portion 10 is formed by curing the photocurable absorbing material 112 by irradiating ultraviolet light using an ultraviolet light irradiation device.

Next, as illustrated in (d) of FIG. 7, the cured absorbing material portion 10 is released from the quartz mold 120. With this, the absorbing material portion 10 having a shape corresponding to the shape of the quartz mold 120 is formed. Here, a thermal treatment may be performed after irradiating the ultraviolet light or after releasing the absorbing material portion 10.

Next, as illustrated in (e) of FIG. 7, a transparent ultraviolet light curable resin material that transmits light is dropped on a concave portion of the absorbing material portion 10, a resin film 131 is covered, and the transparent material portion 20 is formed by curing the ultraviolet light curable resin material by irradiating ultraviolet light using an ultraviolet light irradiation device. The ultraviolet light curable resin material is adjusted such that the refractive index of the transparent material portion 20 made from the ultraviolet light curable resin material becomes substantially equal to the refractive index of the absorbing material portion 10. Further, it is preferable that rate of change in refractive index in accordance with temperature of the absorbing material portion 10 and the transparent material portion 20 is substantially equal so that a difference in the refractive indexes of the absorbing material portion 10 and the transparent material portion 20 is not generated even when temperature varies.

With this, the optical filter of the embodiment is manufactured.

Here, in the above described method of manufacturing, the photocurable absorbing material is formed on the convex portion and the transparent photocurable material was filled in the concave portion of the absorbing material after releasing the photocurable absorbing material. However, alternatively, the order of molding may be changed. In other words, first, a transparent material is filled in a mold provided with a concave portion, a resin film is covered, and the transparent material is cured by irradiating ultraviolet light. Then, after releasing the transparent material, a photocurable absorbing material is dropped on the convex portion of the transparent material. After a resin film is covered, similarly, the absorbing material is cured by irradiating ultraviolet light.

Further, in the optical filter of the embodiment, one of the two resin films illustrated in (e) of FIG. 7 may be omitted. FIG. 4A illustrates an optical filter in which the resin film 131 is not included, and the absorbing material portion 10 is stacked on the resin film 130. FIG. 4B illustrates an optical filter in which the resin film 130 is not included, and the transparent material portion 20 is stacked on the resin film 131. Further, as illustrated in FIG. 4C, an optical filter may be composed by the absorbing material portion 10 and the transparent material portion 20 by omitting both of the resin film 130 and the resin film 131 illustrated in (e) of FIG. 7.

For the resin film, thermoplastic resin such as polyethylene terephthalate (PET), polyethylene naphthalate (PEN), polybutylene terephthalate (PBT), polycarbonate (PC), cycloolefin (COP) or the like, or thermosetting resin such as polyimide (PI), polyether imide (PEI), polyamide (PA), polyamide-imide (PAI) or the like, explained as the transparent resin material, may be used.

In this embodiment, as a method of physically forming a gradation of thickness, the following methods may be used in addition to the method as described above.

Dissolving and dispersing the above described absorbing particle, the dispersing agent, the polymerizable compound and the radical initiator in the organic solvent, and thereafter, coating the solution on a mold that is patterned in a convex shape. Next, the organic solvent is removed by heating or reducing pressure. Finally, the absorbing material can be shaped into an arbitrary shape by curing the polymerizable compound. For coating, spin coating, dip coating, spray coating, flexo printing, screen printing, gravure printing, roll coating, meniscus coating, die-coating or the like may be used. The polymerizable compound may be cured by photo-curing or thermal-curing, and a desired initiator may be selected from the above described radical initiators. In order to prevent inhibition of polymerization due to oxygen in curing, oxygen may be removed by reducing pressure or introducing inert gas in accordance with necessity.

Further, after dispersing the absorbing material in the thermoplastic resin and solvent evenly, the mixed solution may be flew into a mold that is patterned in a convex shape. At this time, precursor of thermosetting resin may be used instead of using thermosetting resin. After coating in the mold, a desired mold body can be manufactured by applying and drying processes.

Further, after evenly dispersing the absorbing material and the thermoplastic resin, the desired mold may be manufactured by injection molding. A desired mold body may be manufactured by molding heated and melted resin composition in a mold by injection molding and cooling.

Further, for another method, a desired mold body may be manufactured by evenly dispersing the absorbing material and the thermoplastic resin, and press molding using a thermal mold. By heating the material at temperature more than or equal to the glass transition point of the thermoplastic resin, viscosity of the resin composition is lowered so that is becomes easy to mold.

Here, although the method of forming the absorbing material portion is explained, the transparent material portion can be similarly formed and an appropriate method may be selected.

As described above, the optical element of the embodiment can be manufactured by giving the thickness distribution to one of the absorbing material and the transparent material and thereafter, filling the other of the absorbing material and the transparent material.

The optical filter of the embodiment may be used by stacking on another optical element included in a camera module. For example, the optical filter may be stacked on a cover glass, a lens unit, an infrared cut filter or the like. Further, the optical filter may be just stacked on a glass, and in such a case, the optical filter easy to be handled can be obtained. Further, the optical filter may be stacked on an ND filter. Further, the optical element that has a function of an ND filter at the same time can be provided by setting $D_{1m}$, illustrated in FIG. 3, to have a desired OD value.

EXAMPLES

Next, examples of the absorbing material portion 10 that compose the optical filter are explained. Specifically, samples of examples 1 to 6 and relative examples 1 to 4 were manufactured in each of which an absorbing material film is formed by a material that can form the absorbing material portion. Conditions for manufacturing the samples are different. OD values, haze values, refractive indexes and viscosities of the manufactured samples of examples 1 to 6 and relative examples 1 to 4 were measured.

When manufacturing the samples, two kinds of titan blacks (TB-1, TB-2) were used as black material particles. Specifically, when manufacturing the samples of examples 1 to 6, titan black (TB-1) was used and when manufacturing the samples of relative examples 1 to 4, titan black (TB-2) was used. The titan black (TB-1) is titan black (fine grain) (manufactured by Mitsubishi Materials corporation) whose specific surface area is 79 $m^2/g$ and average particle size is about 19 nm. Further, the titan black (TB-2) is titan black 12S (manufactured by Mitsubishi Materials Corporation) whose specific surface area is 22 $m^2/g$ and average particle size is about 68 nm.

Further, for the dispersing agent, DisperBYK2164 (manufactured by BYK Japan KK) was used. Further, for the photocurable acrylate, one or more selected from A-DCP (tricyclodecanedimethanoldiacrylate: manufactured by Shin-Nakamura Chemical Co., Ltd.), FA-513AS (dicyclopentanylacrylate: manufactured by Hitachi Chemical Company, Ltd.), OGSOL EA-F5003 (fluorene-based diacrylate: manufactured by Osaka Gas Chemicals), C6FMA (methacrylic acid 2-(perfluorohexyl)ethyl: manufactured by Asahi Glass) was used. Further, for the radical initiator, Irgacure OXE-02 (manufactured by BASF Ltd.) was used.

When calculating the OD value, each of the samples of examples 1 to 6 and relative examples 1 to 4 was prepared to have a thickness of 10 μm. Then, the OD value was calculated based on the following Equation 2 by measuring transmittance $T_{600}$ at wavelength 600 nm of each of the manufactured samples by a spectrophotometer (U3310: manufactured by Hitachi High-Technologies Corporation). Thus, the OD value of the sample with thickness of 10 μm was measured.

$$OD = -\log(T_{600}/100) \qquad \text{[Equation 2]}$$

For the haze value, each of the manufactured samples was measured by an automatic haze meter (TC-HIIIDPK/III: manufactured by Tokyo Denshoku CO., LTD.). The haze value can be obtained by the following Equation 3. Here, "Tt" is total light transmittance and "Td" is diffuse transmittance.

$$\text{HAZE VALUE}(\%) = (Td/Tt) \times 100 \qquad \text{[Equation 3]}$$

As indicated in Equation 3, the haze value depends on total light transmittance "Tt". Specifically, when the total light transmittance "Tt" is 0.1% and if the haze value is 10%, the diffuse transmittance "Td" becomes 0.01%. Further, when the total light transmittance "Tt" is 10% and if the haze value is 10%, the diffuse transmittance "Td" becomes 1%. Here, the thickness of each of the manufactured samples was adjusted such that the total light transmittance "Tt" becomes 10%. Thus, the haze value of the sample for which the total light transmittance "Tt" is 10%, in other words, the OD value is 1 was measured.

The refractive index was obtained by removing a glass at one surface of each of the manufactured samples to expose the absorbing material film, and measuring the refractive index of the exposed absorbing material film by an ellipsometer (M-220: manufactured by JASCO Corporation). The wavelength of the light used in measuring was 589 nm.

The viscosity was obtained by measuring the viscosity of the photocurable absorbing material before irradiating ultraviolet light during manufacturing each of the samples by a cone-plate digital viscometer (DVIII-ultra: manufactured by Brookfield) at an environment temperature of 30° C.

Example 1

Example 1 is explained. In this example, first, as illustrated in table 1, 24 mg of titan black (TB-1) as the black material particle, 24 mg of the dispersing agent (Disper-BYK2164) and 24 ml of methyl acetate were weighed in a glass vial, ultrasonic was irradiated for 15 minutes, and thereafter, a grinding process was performed for three hours after adding 70 g of zirconia beads whose diameter was 0.5 mm. Then, absorbing material dispersion liquid A1 that becomes the absorbing material dispersion liquid 111 was obtained.

TABLE 1

| | |
|---|---|
| BLACK MATERIAL PARTICLE (TB-1) | 24 mg |
| DISPERSING AGENT | 24 mg |
| METHYL ACETATE | 24 ml |

Next, after adding 120 mg of A-DCP, 180 mg of FA-513AS and 9 mg of Irgacure OXE-02 to the obtained absorbing material dispersion liquid A1, methyl acetate was distilled (removed) using an evaporator to obtain a photocurable absorbing material B1 that becomes the photocurable absorbing material 112. The composition ratio of titan black in the photocurable absorbing material B1 was 6.9 wt. %.

Next, the obtained photocurable absorbing material B1 was sandwiched by two glass substrates whose gap was appropriately adjusted to 1 to 30 μm under a heated condition, and ultraviolet light was irradiated at lighting intensity of 100 mW/cm$^2$ for five minutes and at 40° C. using an ultraviolet light irradiation device (Toscure751, manufactured by HARISON TOSHIBA LIGHTING Corporation). Then, by performing a thermal treatment at a temperature of 135° C. for one hour, the sample of example 1 was obtained.

Example 2

Next, example 2 is explained. In this example, using the absorbing material dispersion liquid A1 obtained in example 1, after adding 1000 mg of A-DCP, 1500 mg of FA-513AS and 75 mg of Irgacure OXE-02, methyl acetate was distilled using an evaporator to obtain a photocurable absorbing material B2 that becomes the photocurable absorbing material 112. The composition ratio of titan black in the photocurable absorbing material B2 was 0.94 wt. %.

Next, the obtained photocurable absorbing material B2 was sandwiched by two glass substrates whose gap was appropriately adjusted to 1 to 30 μm under a heated condition, and ultraviolet light was irradiated at lighting intensity of 100 mW/cm$^2$ for five minutes and at 40° C. using an ultraviolet light irradiation device (Toscure751: manufactured by HARISON TOSHIBA LIGHTING Corporation). Then, by performing a thermal treatment at a temperature of 135° C. for one hour, the sample of example 2 was obtained.

Example 3

Next, example 3 is explained. In this example, using the absorbing material dispersion liquid A1 obtained in example 1, after adding 180 mg of A-DCP, 270 mg of FA-513AS and 13.5 mg of Irgacure OXE-02, methyl acetate was distilled using an evaporator to obtain a photocurable absorbing material B3 that becomes the photocurable absorbing material 112. The composition ratio of titan black in the photocurable absorbing material B3 was 4.8 wt. %.

Next, the obtained photocurable absorbing material B3 was sandwiched by two glass substrates whose gap was appropriately adjusted to 1 to 30 μm under a heated condition, and ultraviolet light was irradiated at lighting intensity of 100 mW/cm$^2$ for five minutes and at 40° C. using an ultraviolet light irradiation device (manufactured by HARISON TOSHIBA LIGHTING Corporation Toscure751). Then, by performing a thermal treatment at a temperature of 135° C. for one hour, the sample of example 3 was obtained.

Example 4

Next, example 4 is explained. In this example, using the absorbing material dispersion liquid A1 obtained in example 1, after adding 67 mg of A-DCP, 100 mg of FA-513AS and 5 mg of Irgacure OXE-02, methyl acetate was distilled using an evaporator to obtain a photocurable absorbing material B4 that becomes the photocurable absorbing material 112. The composition ratio of titan black in the photocurable absorbing material B4 was 11.1 wt. %.

Next, the obtained photocurable absorbing material B4 was sandwiched by two glass substrates whose gap was appropriately adjusted to 1 to 30 μm under a heated condition, and ultraviolet light was irradiated at lighting intensity of 100 mW/cm$^2$ for five minutes and at 40° C. using an ultraviolet light irradiation device (Toscure751: manufactured by HARISON TOSHIBA LIGHTING Corporation). Then, by performing a thermal treatment at a temperature of 135° C. for one hour, the sample of example 4 was obtained.

Example 5

Next, example 5 is explained. In this example, using the absorbing material dispersion liquid A1 obtained in example 1, after adding 450 mg of OGSOL EA-F5003 and 13.5 mg of Irgacure OXE-02, methyl acetate was distilled using an evaporator to obtain a photocurable absorbing material B5 that becomes the photocurable absorbing material 112. The composition ratio of titan black in the photocurable absorbing material B5 was 4.8 wt. %.

Next, the obtained photocurable absorbing material B5 was sandwiched by two glass substrates whose gap was appropriately adjusted to 1 to 30 μm under a heated condition, and ultraviolet light was irradiated at lighting intensity of 100 mW/cm$^2$ for five minutes and at 40° C. using an ultraviolet light irradiation device (Toscure751: manufactured by HARISON TOSHIBA LIGHTING Corporation). Then, by performing a thermal treatment at a temperature of 135° C. for one hour, the sample of example 5 was obtained.

Example 6

Next, example 6 is explained. In this example, using the absorbing material dispersion liquid A1 obtained in example 1, after adding 450 mg of C6FMA and 13.5 mg of Irgacure OXE-02, methyl acetate was distilled using an evaporator to obtain a photocurable absorbing material B6 that becomes the photocurable absorbing material 112. The composition ratio of titan black in the photocurable absorbing material B6 was 4.8 wt. %.

Next, the obtained photocurable absorbing material B6 was sandwiched by two glass substrates whose gap was appropriately adjusted to 1 to 30 μm under a heated condition, and ultraviolet light was irradiated at lighting intensity of 100 mW/cm² for five minutes and at 40° C. using an ultraviolet light irradiation device (Toscure751: manufactured by HARISON TOSHIBA LIGHTING Corporation). Then, by performing a thermal treatment at a temperature of 135° C. for one hour, the sample of example 6 was obtained.

Relative Example 1

Relative example 1 is explained. In this relative example, first, as illustrated in table 2, 24 mg of titan black (TB-2) as the black material particle, 24 mg of the dispersing agent (DisperBYK2164) and 24 ml of methyl acetate were added in a glass vial, ultrasonic was irradiated for 15 minutes, and thereafter, a grinding process was performed for three hours after adding 70 g of zirconia beads whose diameter was 0.5 mm. Then, absorbing material dispersion liquid A2 was obtained.

TABLE 2

| | |
|---|---|
| BLACK MATERIAL PARTICLE (TB-2) | 24 mg |
| DISPERSING AGENT | 24 mg |
| METHYL ACETATE | 24 ml |

Next, after adding 4700 mg of A-DCP, 7050 mg of FA-513AS and 350 mg of Irgacure OXE-02 to the obtained absorbing material dispersion liquid A2, methyl acetate was distilled (removed) using an evaporator to obtain a photocurable absorbing material B7. The composition ratio of titan black in the photocurable absorbing material B7 was 0.2 wt. %.

Next, the obtained photocurable absorbing material B7 was sandwiched by two glass substrates whose gap was appropriately adjusted to 1 to 30 μm under a heated condition, and ultraviolet light was irradiated at lighting intensity of 100 mW/cm² for five minutes and at 40° C. using an ultraviolet light irradiation device (Toscure751, manufactured by HARISON TOSHIBA LIGHTING Corporation). Then, by performing a thermal treatment at a temperature of 135° C. for one hour, the sample of relative example 1 was obtained.

Relative Example 2

Next, relative example 2 is explained. In this relative example, using the absorbing material dispersion liquid A2 obtained in relative example 1, after adding 28 mg of A-DCP, 42 mg of FA-513AS and 2 mg of Irgacure OXE-02, methyl acetate was distilled using an evaporator to obtain a photocurable absorbing material B8. The composition ratio of titan black in the photocurable absorbing material B8 was 20 wt. %.

Next, the obtained photocurable absorbing material B8 was sandwiched by two glass substrates whose gap was appropriately adjusted to 1 to 30 μm under a heated condition, and ultraviolet light was irradiated at lighting intensity of 100 mW/cm² for five minutes and at 40° C. using an ultraviolet light irradiation device (Toscure751: manufactured by HARISON TOSHIBA LIGHTING Corporation). Then, by performing a thermal treatment at a temperature of 135° C. for one hour, the sample of relative example 2 was obtained.

Relative Example 3

Next, relative example 3 is explained. In this relative example, using the absorbing material dispersion liquid A2 obtained in relative example 1, after adding 300 mg of A-DCP, 450 mg of FA-513AS and 13.5 mg of Irgacure OXE-02, methyl acetate was distilled using an evaporator to obtain a photocurable absorbing material B9. The composition ratio of titan black in the photocurable absorbing material B9 was 3.0 wt. %.

Next, the obtained photocurable absorbing material B9 was sandwiched by two glass substrates whose gap was appropriately adjusted to 1 to 30 μm under a heated condition, and ultraviolet light was irradiated at lighting intensity of 100 mW/cm² for five minutes and at 40° C. using an ultraviolet light irradiation device (Toscure751: manufactured by HARISON TOSHIBA LIGHTING Corporation). Then, by performing a thermal treatment at a temperature of 135° C. for one hour, the sample of relative example 3 was obtained.

Relative Example 4

Next, relative example 4 is explained. In this relative example, using the absorbing material dispersion liquid A2 obtained in relative example 1, after adding 180 mg of A-DCP, 270 mg of FA-513AS and 13.5 mg of Irgacure OXE-02, methyl acetate was distilled using an evaporator to obtain a photocurable absorbing material B10. The composition ratio of titan black in the photocurable absorbing material B10 was 4.8 wt. %.

Next, the obtained photocurable absorbing material B10 was sandwiched by two glass substrates whose gap was appropriately adjusted to 1 to 30 μm under a heated condition, and ultraviolet light was irradiated at lighting intensity of 100 mW/cm² for five minutes and at 40° C. using an ultraviolet light irradiation device (Toscure751: manufactured by HARISON TOSHIBA LIGHTING Corporation). Then, by performing a thermal treatment at a temperature of 135° C. for one hour, the sample of relative example 4 was obtained.

Evaluation of Samples of Examples 1 to 6 and Relative Examples 1 to 4

Evaluations of the samples of examples 1 to 6 and relative examples 1 to 4 are explained. Specifically, results of measurement of OD values, haze values, refractive indexes, viscosities of the samples of examples 1 to 6 and relative examples 1 to 4 are illustrated in table 3. As described above, viscosities indicate viscosities of the photocurable absorbing materials B1 to B10, which were used when manufacturing the samples of examples 1 to 6 and relative examples 1 to 4, at a state before the ultraviolet light was irradiated.

TABLE 3

| | PHOTOCURABLE ABSORBING MATERIAL | COMPOSITION RATIO OF TITAN BLACK (wt %) | OD VALUE $OD_{600}$ (10 μm) | HAZE VALUE (%) (10% T) | REFRACTIVE INDEX | VISCOSITY (mPas) |
|---|---|---|---|---|---|---|
| EXAMPLE 1 | B1 | 6.9 | 1.5 | 3.2 | 1.54 | 220 |
| EXAMPLE 2 | B2 | 0.94 | 0.28 | 3.1 | 1.51 | 190 |
| EXAMPLE 3 | B3 | 4.8 | 1.02 | 3.4 | 1.52 | 200 |
| EXAMPLE 4 | B4 | 11.1 | 2.44 | 3.8 | 1.57 | 340 |
| EXAMPLE 5 | B5 | 4.8 | 1.01 | 3.2 | 1.61 | 3500 |
| EXAMPLE 6 | B6 | 4.8 | 1.00 | 3.8 | 1.39 | 80 |
| RELATIVE EXAMPLE 1 | B7 | 0.2 | 0.05 | 3.8 | 1.51 | 180 |
| RELATIVE EXAMPLE 2 | B8 | 20 | 5.0 | 4.8 | 1.60 | 450 |
| RELATIVE EXAMPLE 3 | B9 | 3.0 | 0.51 | 37 | — | — |
| RELATIVE EXAMPLE 4 | B10 | 4.8 | 1.29 | 42 | — | — |

As illustrated in table 3, for the sample of example 1, the OD value was 1.5, the haze value was 3.2%, the refractive index was 1.54 and the viscosity was 220 mPa·s. Further, for the sample of example 2, the OD value was 0.28, the haze value was 3.1%, the refractive index was 1.51 and the viscosity was 190 mPa·s. Further, for the sample of example 3, the OD value was 1.02, the haze value was 3.4%, the refractive index was 1.52 and the viscosity was 200 mPa·s. Further, for the sample of example 4, the OD value was 2.44, the haze value was 3.8%, the refractive index was 1.57 and the viscosity was 340 mPa·s. Further, for the sample of example 5, the OD value was 1.01, the haze value was 3.2%, the refractive index was 1.61 and the viscosity was 3500 mPa·s. Further, for the sample of example 6, the OD value was 1.00, the haze value was 3.8%, the refractive index was 1.39 and the viscosity was 80 mPa·s.

Further, for the sample of relative example 1, the OD value was 0.05, the haze value was 3.8%, the refractive index was 1.51 and the viscosity was 180 mPa·s. Further, for the sample of relative example 2, the OD value was 5.0, the haze value was 4.8%, the refractive index was 1.60 and the viscosity was 450 mPa·s. Further, for the sample of relative example 3, the OD value was 0.51 and the haze value was 37%. Further, for the sample of relative example 4, the OD value was 1.29 and the haze value was 42%.

Based on the measured results of examples 1 to 6, by forming the absorbing material portion such that the OD value is greater than or equal to 0.2 and less than or equal to 2.5 when the thickness is 10 μm and also the haze value is less than or equal to 10%, an optical filter with a good optical property can be obtained. Further, it is preferable that the refractive index of the absorbing material portion of light with wavelength of 589 nm is greater than or equal to 1.35 and less than or equal to 1.65. Further, as the viscosity of the photocurable absorbing material before irradiating ultraviolet light that is used when forming the absorbing material portion is greater than or equal to 50 mPa·s and less than or equal to 3500 mPa·s at 30° C., viscosity is low and it is preferably used when forming the absorbing material portion of the optical filter by an imprint process or the like.

Example 7

Next, example 7 is explained. The example relates to an optical filter and a method of manufacturing the optical filter is explained with reference to FIG. 7.

First, as illustrated in (a) of FIG. 7, the quartz mold 120 made of quartz is prepared. The quartz mold 120 is provided with a convex portion at its center portion, and provided with a concave portion at periphery of the convex portion. A curved surface of the convex portion is formed such as to satisfy $Z(r)=A \times r^2$, where "r" indicates a length from the center in a radius direction, $Z(r)$ indicates a position at the surface and A is a coefficient. The height of the convex portion is 30 μm and the diameter of a region where the concave portion is formed is 3 mm.

Next, as illustrated in (b) of FIG. 7, 0.7 mg of the photocurable absorbing material B3 obtained in example 3 is dropped on the quartz mold 120.

Next, as illustrated in (c) of FIG. 7, the resin film 130 made of a cycloolefin film (ZF-14, manufactured by Zeon Corporation, a reference value of Young's modulus is 2.2 GPa) and whose thickness is about 188 μm is covered on the dropped photocurable absorbing material B3. Thereafter, the absorbing material portion 10 is formed by curing the photocurable absorbing material B3 by irradiating UV light of 300 mW/cm² for 100 seconds by a fiber type UV exposing device (spot light source LC6: manufactured by Hamamatsu Photonics), which is an ultraviolet light irradiation device. In the photocurable absorbing material B3, rate of change of refractive index dn/dT in accordance with a temperature within a range of 30° C. to 80° C. was −216 ppm/K.

Next, as illustrated in (d) of FIG. 7, the cured absorbing material portion 10 is released from the quartz mold 120 and a thermal treatment at a temperature of 135° C. for one hour is performed.

Next, as illustrated in (e) of FIG. 7, 0.5 mg of the transparent ultraviolet light curable resin material that transmits light obtained by mixing 32 parts of A-DCP, 65 parts of FA-513AS and 3 parts of Irgacure OXE-02 as illustrated in table 4 is dropped on the concave portion of the absorbing material portion 10. Then, the resin film 131 made of a cycloolefin film (ZF-14, manufactured by Zeon Corporation) and whose thickness is about 188 μm is covered on the dropped transparent ultraviolet light curable resin material. Thereafter, the transparent material portion 20 is formed by curing the ultraviolet light curable resin material by irradiating UV light of 300 mW/cm² for 100 seconds by a fiber type UV exposing device (spot light source LC6: manufactured by Hamamatsu Photonics), which is an ultraviolet light irradiation device. At this time, the refractive index of the transparent material portion 20 at 589 nm was 1.53. In the transparent material portion 20, rate of change of refractive index dn/dT in accordance with temperature within a range of 30° C. to 80° C. was −181 ppm/K.

As the absolute value of the difference between the rates of change in refractive index in accordance with temperature of the absorbing material portion 10 and the transparent material portion 20 is 35 ppm/K, and the optical filter does not have an optical function other than light reduction even when temperature varies, the optical filter can be preferably used as an apodizing filter.

TABLE 4

| A-DCP | 32 PARTS |
|---|---|
| FA-513AS | 65 PARTS |
| Irgacure OXE-02 | 3 PARTS |

According to the above steps, the optical filter of the example was manufactured.

Figure 8:
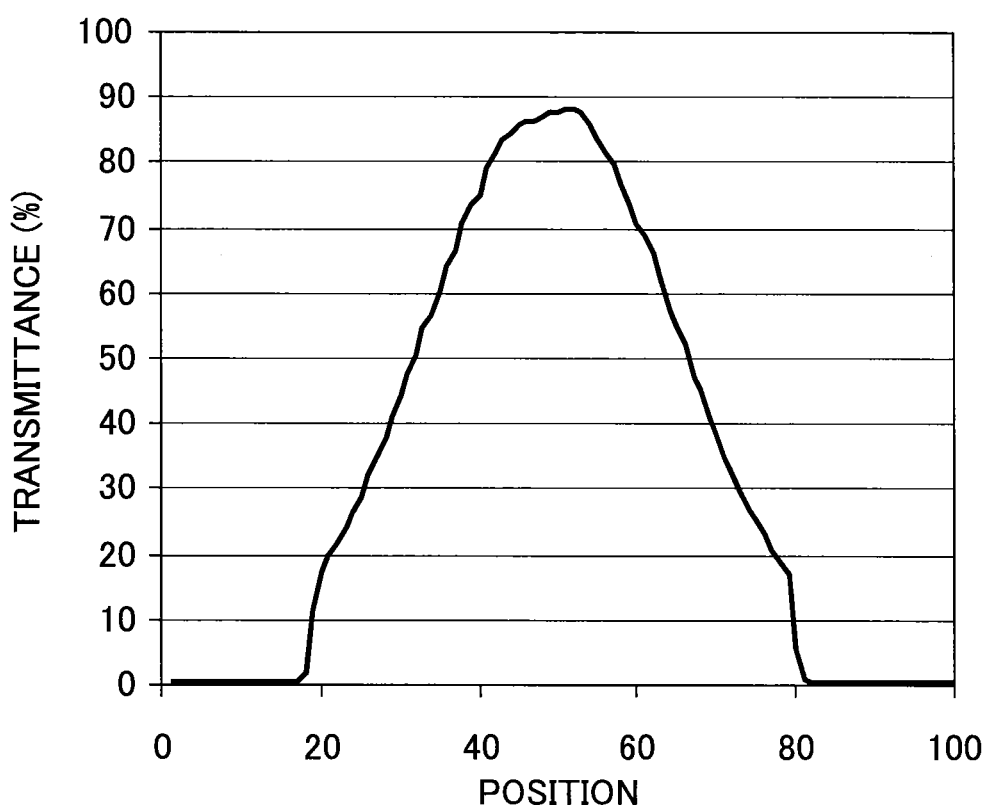
FIG. 8 is a distribution view illustrating transmittance of an optical filter of example 7.

The optical filter of the example was placed at a spot position of laser light, the laser light was irradiated after being condensed with a lens or the like such that a spot diameter became 50 μm, and intensity of light that transmits the optical filter was measured by a laser light measurement device. Specifically, the laser light whose wavelength was 633 nm was irradiated, and transmittance distribution of the optical filter of the example was measured by moving the optical filter of the example by an auto-stage. As a result, transmittance of the center portion of the optical filter of the example was 89%. Further, as illustrated in FIG. 8, for the optical filter of the example, transmittance monotonically decreased in accordance with the distance from the center portion.

Example 8

Example 8 is explained. In this example, as illustrated in table 5, 112 mg of titan black (TB-1) and 85 mg of carbon black (FW200: manufactured by DEGUSSA) as the black material particle, 107 mg of the dispersing agent (Disper-BYK2164) and 200 ml of methyl acetate as the solvent were weighed in a glass vial, ultrasonic was irradiated for 15 minutes, and thereafter, a grinding process was performed for three hours after adding 400 g of zirconia beads whose diameter was 0.5 mm. Then, absorbing material dispersion liquid A3 that becomes the absorbing material dispersion liquid 111 was obtained.

TABLE 5

| BLACK MATERIAL PARTICLE (TB-1) | 112 mg |
|---|---|
| BLACK MATERIAL PARTICLE (CB-1) | 85 mg |
| DISPERSING AGENT | 107 mg |
| METHYL ACETATE | 200 ml |

Next, after adding 1.59 g of A-DCP, 2.38 g of FA-513AS and 120 mg of Irgacure OXE-02 to the obtained absorbing material dispersion liquid A3, methyl acetate was distilled (removed) using an evaporator to obtain a photocurable absorbing material B11 that becomes the photocurable absorbing material 112. The composition ratio of titan black in the photocurable absorbing material B11 was 2.5 wt. % and the composition ratio of carbon black in the photocurable absorbing material B11 was 1.9 wt. %.

Next, the obtained photocurable absorbing material B11 was sandwiched by two glass substrates whose gap was appropriately adjusted to 1 to 30 μm under a heated condition, and ultraviolet light was irradiated at lighting intensity of 100 mW/cm² for five minutes and at 40° C. using an ultraviolet light irradiation device (Toscure751: manufactured by HARISON TOSHIBA LIGHTING Corporation). Then, by performing a thermal treatment at a temperature of 135° C. for one hour, the sample of example 8 was obtained.

Example 9

Example 9 is explained. Using the absorbing material dispersion liquid A3 obtained in example 8, after adding 0.86 g of A-DCP, 1.29 g of FA-513AS and 65 mg of Irgacure OXE-02, methyl acetate was distilled using an evaporator to obtain a photocurable absorbing material B12 that becomes the photocurable absorbing material 112. The composition ratio of titan black in the photocurable absorbing material B12 was 4.4 wt. % and the composition ratio of carbon black in the photocurable absorbing material B12 was 3.3 wt. %. Next, the sample of example 9 was manufactured by the method illustrated in example 7.

Example 10

Example 10 is explained. Using the absorbing material dispersion liquid A3 illustrated in example 8, after adding 7.6 g of A-DCP, 11.4 g of FA-513AS and 950 mg of Irgacure OXE-02, methyl acetate was distilled using an evaporator to obtain a photocurable absorbing material B13 that becomes the photocurable absorbing material 112. The composition ratio of titan black in the photocurable absorbing material B13 was 0.55 wt. % and the composition ratio of carbon black in the photocurable absorbing material B13 was 0.42 wt. %. Next, the sample of example 10 was manufactured by the method illustrated in example 7.

Example 11

Example 11 is explained. Using the absorbing material dispersion liquid A3 illustrated in example 8, after adding 0.5 g of A-DCP, 0.76 g of FA-513AS and 64 mg of Irgacure OXE-02, methyl acetate was distilled using an evaporator to obtain a photocurable absorbing material B14 that becomes the photocurable absorbing material 112. The composition ratio of titan black in the photocurable absorbing material B14 was 6.8 wt. % and the composition ratio of carbon black in the photocurable absorbing material B14 was 5.2 wt. %. Next, the sample of example 11 was manufactured by the method illustrated in example 7.

TABLE 6

|  | PHOTOCURABLE ABSORBING MATERIAL | COMPOSITION RATIO OF TITAN BLACK (wt %) | COMPOSITION RATIO OF CARBON BLACK (wt %) | OD VALUE $OD_{600}$ (10 µm) | HAZE VALUE (%) (10% T) | REFRACTIVE INDEX | VISCOSITY (mPas) |
|---|---|---|---|---|---|---|---|
| EXAMPLE 8 | B11 | 2.5 | 1.9 | 1.37 | 2.8 | 1.52 | 50 |
| EXAMPLE 9 | B12 | 4.4 | 3.3 | 2.44 | 2.9 | 1.53 | 110 |
| EXAMPLE 10 | B13 | 0.55 | 0.42 | 0.30 | 3.2 | 1.51 | 35 |
| EXAMPLE 11 | B14 | 6.84 | 5.18 | 3.80 | 3.0 | 1.57 | 230 |

Evaluation of Samples of Examples 8 to 11

Next, evaluations of the samples of examples 8 to 11 are explained. Specifically, results of measurement of OD values, haze values, refractive indexes, viscosities of the samples of examples 8 to 11 are illustrated in table 6. As described above, the viscosities indicate viscosities of the photocurable absorbing materials B11 to B14, which were used when manufacturing the samples of examples 8 to 11, at a state before the ultraviolet light was irradiated.

As illustrated in table 6, for the sample of example 8, the OD value was 1.37, the haze value was 2.8%, the refractive index was 1.52 and the viscosity was 50 mPa·s. Further, for the sample of example 9, the OD value was 2.44, the haze value was 2.9%, the refractive index was 1.53 and the viscosity was 110 mPa·s. Further, for the sample of example 10, the OD value was 0.30, the haze value was 3.2%, the refractive index was 1.51 and the viscosity was 35 mPa·s. Further, for the sample of example 11, the OD value was 3.80, the haze value was 3.0%, the refractive index was 1.57 and the viscosity was 230 mPa·s.

Based on the measured results of examples 8 to 11, by forming the absorbing material portion such that the OD value is greater than or equal to 0.2 and less than or equal to 4.0 when the thickness is 10 µm and also the haze value is less than or equal to 10%, an optical filter with a good optical property can be obtained. Further, it is preferable that the refractive index of the absorbing material portion of light with wavelength of 589 nm is greater than or equal to 1.35 and less than or equal to 1.65. Further, as the viscosity of the photocurable absorbing material before irradiating ultraviolet light that is used when forming the absorbing material portion is greater than or equal to 50 mPa·s and less than or equal to 3500 mPa·s at 30° C., viscosity is low and it is preferably used when forming the absorbing material portion of the optical filter by an imprint process or the like.

Example 12

Next, example 12 is explained. The example relates to an optical filter, and an optical filter was obtained by the same method as explained in example 7 except that B3 was substituted by B11.

The optical filter of example 12 was placed at a spot position of laser light, the laser light was irradiated after condensing by a lens or the like such that a spot diameter becomes 50 µm, and intensity of light that transmits the optical filter was measured by a laser light measurement device. Specifically, the laser light whose wavelength is 633 nm was irradiated, and transmittance distribution of the optical filter of the example was measured by moving the optical filter of the example by an auto-stage. As a result, transmittance was 91% and the thickness of the absorbing material was 0.02 µm at the center portion of the example. Further, similar to as illustrated in FIG. 8, for the optical filter of the example, transmittance monotonically decreased in accordance with the distance from the center portion.

Figure 9:
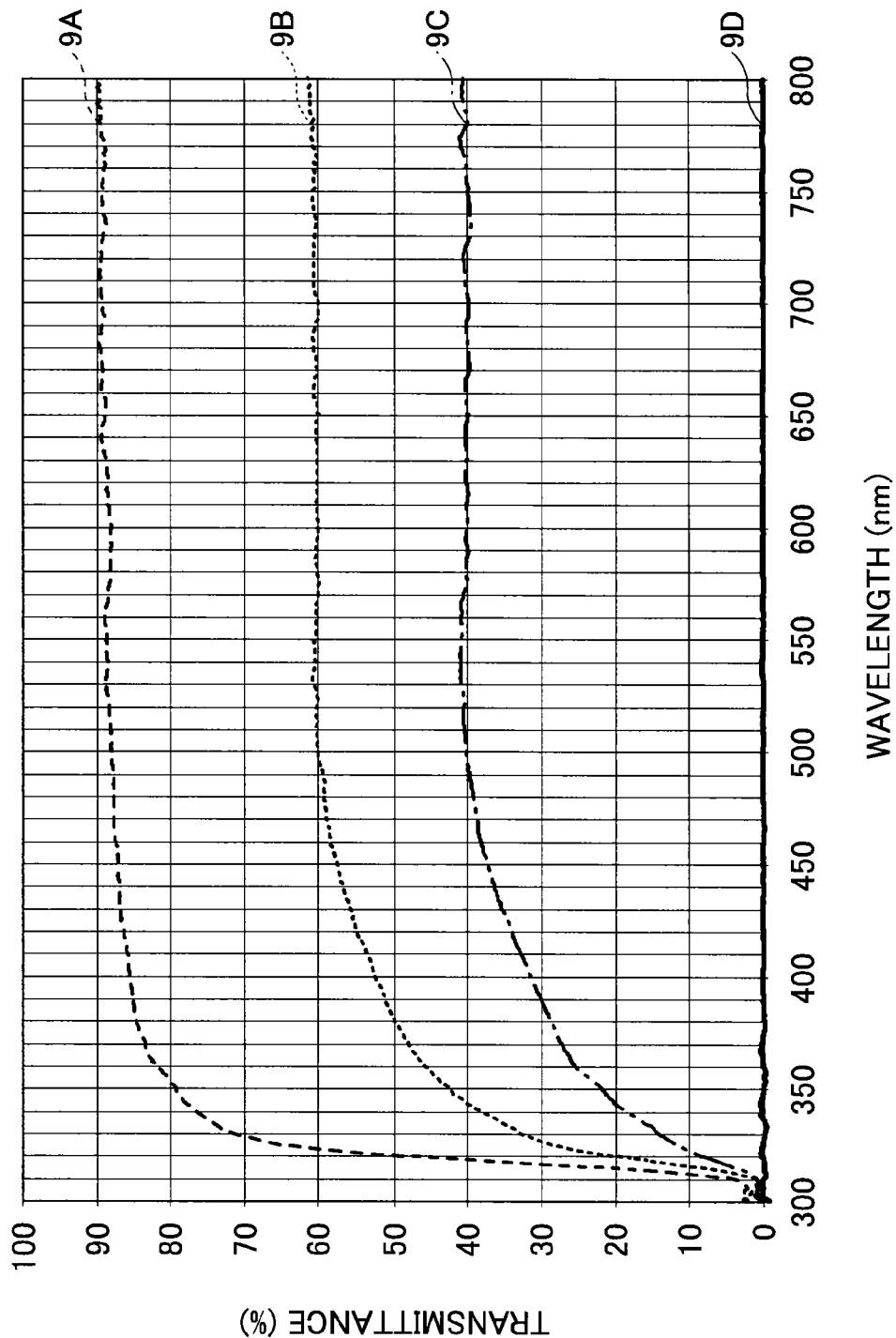
FIG. 9 is a correlation diagram of wavelength and transmittance of light of the optical filter.

Next, optical spectra of the center portion, intermediate portions and the end portion of example 12, namely, relationships between the wavelength of light and transmittance were measured. The measured results are illustrated in FIG. 9. In FIG. 9, 9A indicates the center portion where the transmittance of visible light is about 88.0%, 9B indicates the intermediate portion where the transmittance of visible light is about 58.7%, 9C indicates the intermediate portion where the transmittance of visible light is about 38.6% and 9D indicates the end portion where the transmittance of visible light is about 0.1%.

For the center portion whose transmittance of visible light is about 88.0% of 9A, the transmittance $T_{450}$ at wavelength 450 nm is about 87.2%, the transmittance $T_{650}$ at wavelength 650 nm was about 90.0% and $|T_{450}-T_{650}|$ was about 1.8%. Further, for the intermediate portion whose transmittance of visible light is about 58.7% of 9B, $T_{450}$ is about 57.5%, $T_{650}$ is about 60.0% and $|T_{450}-T_{650}|$ is about 2.5%. Further, for the intermediate portion whose transmittance of visible light is about 38.6% of 9C, $T_{450}$ is about 37.3%, $T_{650}$ is about 40.0% and $|T_{450}-T_{650}|$ is about 2.7%. Further, for the end portion 9D whose transmittance of visible light is about 0.1% of 9D, $T_{450}$ is about 0.1%, $T_{650}$ is about 0.1% and $|T_{450}-T_{650}|$ is about 0.0%. With this, the optical filter of example 12 can be preferably used as an apodizing filter because wavelength dependency of absorption is low.

Next, surface aberration of a transmitted wave was measured for the optical filter obtained in example 12 by a laser interferometer R10 (manufactured by Fuji Film corporation). As a result, PV (peak to valley) value was 0.7λ and a difference Δd between the maximum value and the minimum value in thickness within an effective diameter area of the optical filter was 860 nm. Here, the measured wavelength was 650 nm and the measured diameter was 2.5 mm.

With this, the optical filter can be preferably used as an apodizing filter because the difference Δd in thickness at the surface is small, a difference in optical path length PV is also small and the optical filter does not express an unintended optical function.

Example 13

Next, example 13 is explained. In example 13, an apodizing filter is stacked on a glass that has an infrared cut function.

First, a glass with an ultraviolet light and infrared cut function was manufactured by forming a dielectric multi-layer film composed of $SiO_2$ and $TiO_2$ at one surface of a fluorophosphate-based glass (NF50T, manufactured by Asahi Glass).

Next, 0.7 mg of the photocurable absorbing material B11 obtained in example 8 was dropped on the quartz mold 120 used in example 7. Then, the above described glass was covered on the photocurable absorbing material B11 such that a surface of the glass at which the dielectric multilayer film was not stacked faces the material B11. Thereafter, the absorbing material portion 10 was formed by curing the photocurable absorbing material B11 by irradiating UV light of 300 mW/cm² for 100 seconds by a fiber type UV exposing device (spot light source LC6, manufactured by Hamamatsu Photonics), which is an ultraviolet light irradiation device.

Next, the cured absorbing material portion 10 was released from the quartz mold 120 and performed with a thermal treatment at a temperature of 135° C. for an hour.

Next, 0.5 mg of the transparent ultraviolet light curable resin material that transmits light illustrated in table 4 was dropped on the concave portion of the absorbing material portion 10. Then, a glass provided with an anti-sticking treatment is covered. Subsequently, the transparent material portion 20 was formed by curing the ultraviolet light curable resin material by irradiating UV light of 300 mW/cm² for 100 seconds. Finally, an apodizing filter with an infrared cut function was obtained by releasing the glass.

Figure 10:
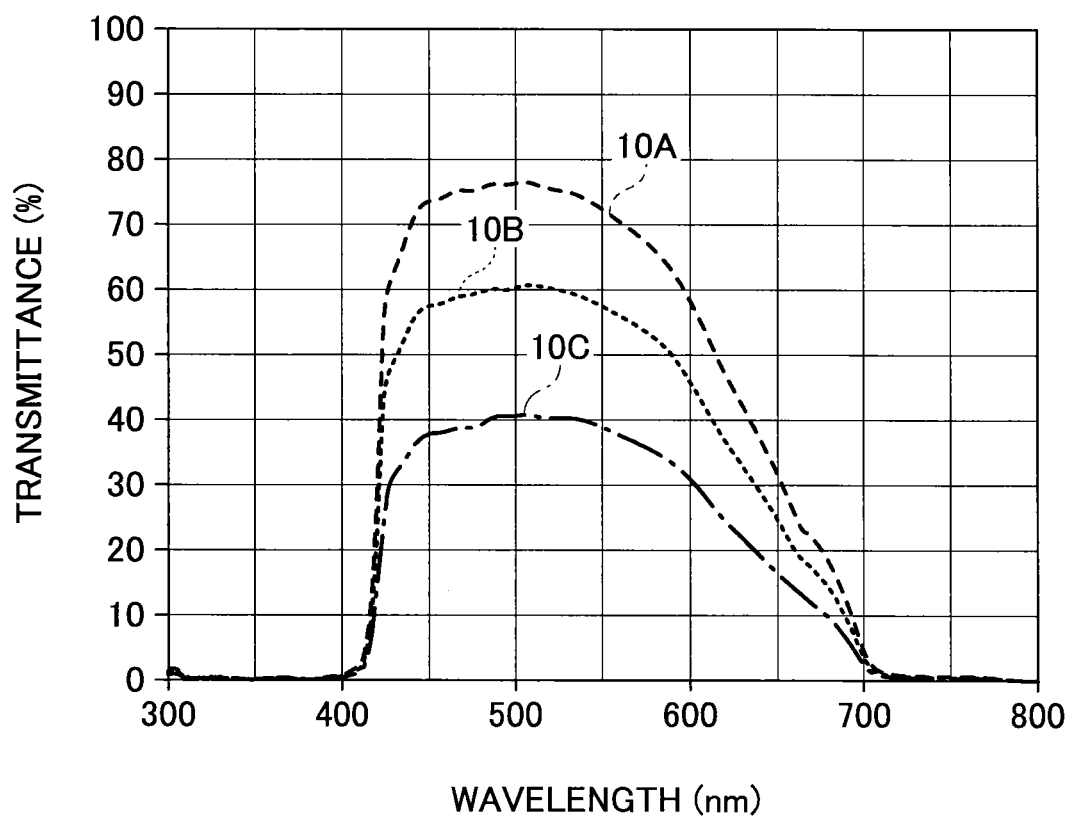
FIG. 10 is a view for explaining transmittance distribution of an optical filter of example 13.

Next, optical spectra of the center portion, the intermediate portions and the end portion of the obtained apodizing filter were measured. The measured results are illustrated in FIG. 10. In FIG. 10, 10A indicates the optical spectrum of the center portion of the apodizing filter and 10B and 10C indicate the optical spectra of the intermediate portions of the apodizing filter. As illustrated in FIG. 10, it can be understood that the optical element of example 13 has an ultraviolet light and infrared cut function and also can function as an apodizing filter for visible light.

Although a preferred embodiment has been specifically illustrated and described, it is to be understood that minor modifications may be made therein without departing from the spirit and scope of the invention as defined by the claims.

What is claimed is:

1. An optical element comprising:
    an absorbing material portion made of a material that absorbs a part of light and formed such that the absorbing material portion has a thickness monotonically increases from a center portion of the absorbing material portion toward a peripheral portion of the absorbing material portion; and
    a transparent material portion made of a material that transmits light and stacked on the absorbing material portion,
    wherein the absorbing material portion and the transparent material portion are formed such that a total thickness of the absorbing material portion and the transparent material portion is substantially constant, and the absorbing material portion is formed such that the absorbing material portion satisfies $|T_{450}-T_{650}|\leq 5\%$ within a region where an average value of transmittance from wavelength of 380 nm to 700 nm is between 40% to 80%, where $T_{450}$ is transmittance at a wavelength of 450 nm and $T_{650}$ is transmittance at a wavelength of 650 nm.

2. The optical element according to claim 1, wherein transmittance of the absorbing material portion conforms to a Gaussian distribution from the center portion toward the peripheral portion.

3. The optical element according to claim 1, wherein the absorbing material portion and the transparent material portion are formed such that a refractive index of the absorbing material portion and a refractive index of the transparent material portion are substantially equal.

4. The optical element according to claim 1, wherein the absorbing material portion has a thickness at the center portion which is less than or equal to 0.5 µm.

5. The optical element according to claim 1, wherein the absorbing material portion and the transparent material portion are formed such that a temperature coefficient of a refractive index of the absorbing material portion and a temperature coefficient of a refractive index of the transparent material portion are substantially equal.

6. The optical element according to claim 1, wherein the absorbing material portion is formed such that an OD value of the absorbing material portion, when a thickness of the absorbing material portion is 10 µm, is greater than or equal to 0.2.

7. The optical element according to claim 1, wherein the absorbing material portion is formed such that a haze value of the absorbing material portion, when an OD value of the absorbing material portion is 1, is less than or equal to 10%.

8. The optical element according to claim 1, wherein the absorbing material portion is formed such that a refractive index of the absorbing material portion for light whose wavelength is 589 nm is greater than or equal to 1.35 and less than or equal to 1.65.

9. The optical element according to claim 1, wherein the absorbing material portion and the transparent material portion are formed such that a difference between a maximum value and a minimum value of the total thickness of the absorbing material portion and the transparent material portion within an effective region of the optical element is less than or equal to 1 µm.

10. The optical element according to claim 1, wherein the material of the absorbing material portion includes at least one of titan black and carbon black.

11. The optical element according to claim 1, further comprising:
    a base material on which the absorbing material portion and the transparent material portion are stacked,
    wherein the base material is a resin film or a glass.

12. The optical element according to claim 1, further comprising:
    a cover glass on which the absorbing material portion and the transparent material portion are stacked.

13. The optical element according to claim 1, wherein the light is visible light.

14. The optical element according to claim 1, further comprising:
    an antireflection film formed on one surface or both surfaces of a stacked structure of the absorbing material portion and the transparent material portion,
    wherein the antireflection film reduces reflection of light having a wavelength in a range between 430 nm to 630 nm.

15. The optical element according to claim 1, wherein the absorbing material portion and the transparent material portion are formed such that a difference between a maximum value and a minimum value of an optical path length at wavelength of 650 nm within an effective region of the optical element is less than or equal to the wavelength.

16. The optical element according to claim 1, wherein the material of the absorbing material portion comprises a photocurable absorbing material having a viscosity which is greater than or equal to 50 mPa·s and less than or equal to 3500 mPa·s at 30° C.

17. The optical element according to claim 1, further comprising:

an infrared cut filter on which the absorbing material portion and the transparent material portion are stacked.

18. The optical element according to claim 17, wherein the infrared cut filter includes a phosphate glass or a fluorophosphate glass.

19. The optical element according to claim 17, wherein the infrared cut filter includes a dye.

20. The optical element according to claim 17, wherein the infrared cut filter includes a dielectric multilayer film.

21. The optical element according to claim 1, further comprising:
a lens,
wherein the absorbing material portion is stacked on the lens.

22. An optical element, comprising:
an absorbing material portion made of a material that absorbs a part of light and formed such that the absorbing material portion has a thickness monotonically increases from a center portion of the absorbing material portion toward a peripheral portion of the absorbing material portion; and
a transparent material portion made of a material that transmits light and stacked on the absorbing material portion,
wherein the absorbing material portion and the transparent material portion are formed such that a total thickness of the absorbing material portion and the transparent material portion is substantially constant, and the absorbing material portion is formed such that an OD value of the absorbing material portion, when a thickness of the absorbing material portion is 10 μm, is greater than or equal to 0.2.

23. An optical element, comprising:
an absorbing material portion made of a material that absorbs a part of light and formed such that the absorbing material portion has a thickness monotonically increases from a center portion of the absorbing material portion toward a peripheral portion of the absorbing material portion; and
a transparent material portion made of a material that transmits light and stacked on the absorbing material portion,
wherein the absorbing material portion and the transparent material portion are formed such that a total thickness of the absorbing material portion and the transparent material portion is substantially constant, and the absorbing material portion is formed such that a haze value of the absorbing material portion, when an OD value of the absorbing material portion is 1, is less than or equal to 10%.

24. An optical element, comprising:
an absorbing material portion made of a material that absorbs a part of light and formed such that the absorbing material portion has a thickness monotonically increases from a center portion of the absorbing material portion toward a peripheral portion of the absorbing material portion; and
a transparent material portion made of a material that transmits light and stacked on the absorbing material portion,
wherein the absorbing material portion and the transparent material portion are formed such that a total thickness of the absorbing material portion and the transparent material portion is substantially constant, and the material of the absorbing material portion comprises a photocurable absorbing material having a viscosity which is greater than or equal to 50 mPa·s and less than or equal to 3500 mPa·s at 30° C.

* * * * *